Nov. 22, 1960     R. E. BELL ET AL     2,961,160
ELECTRONIC MULTIPLIER
Filed May 28, 1956     9 Sheets-Sheet 1
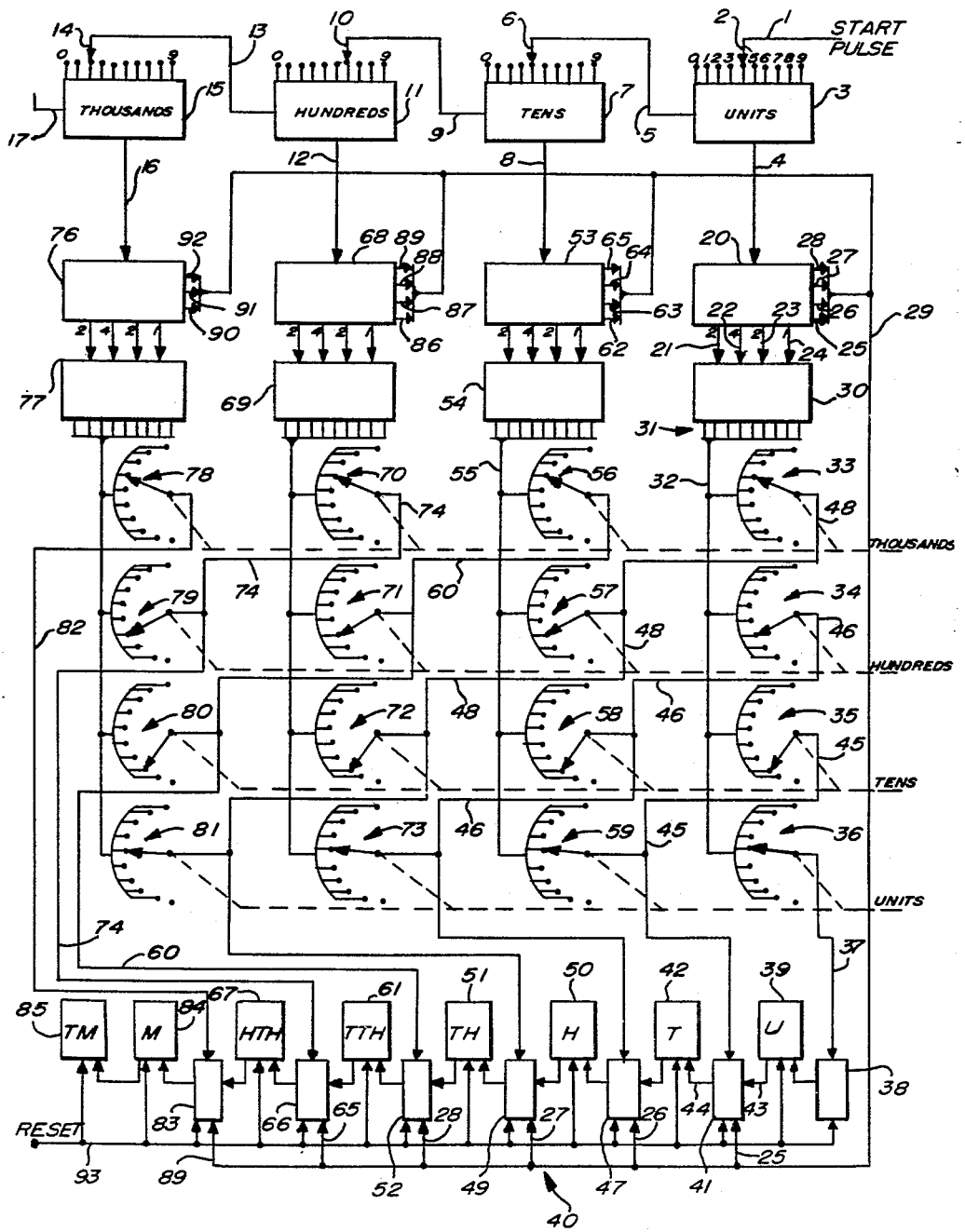
Fig. I
INVENTORS
ROBERT E. BELL
MAYNARD C. YEASTING
BY
Marshall, Marshall & Yeasting
ATTORNEYS

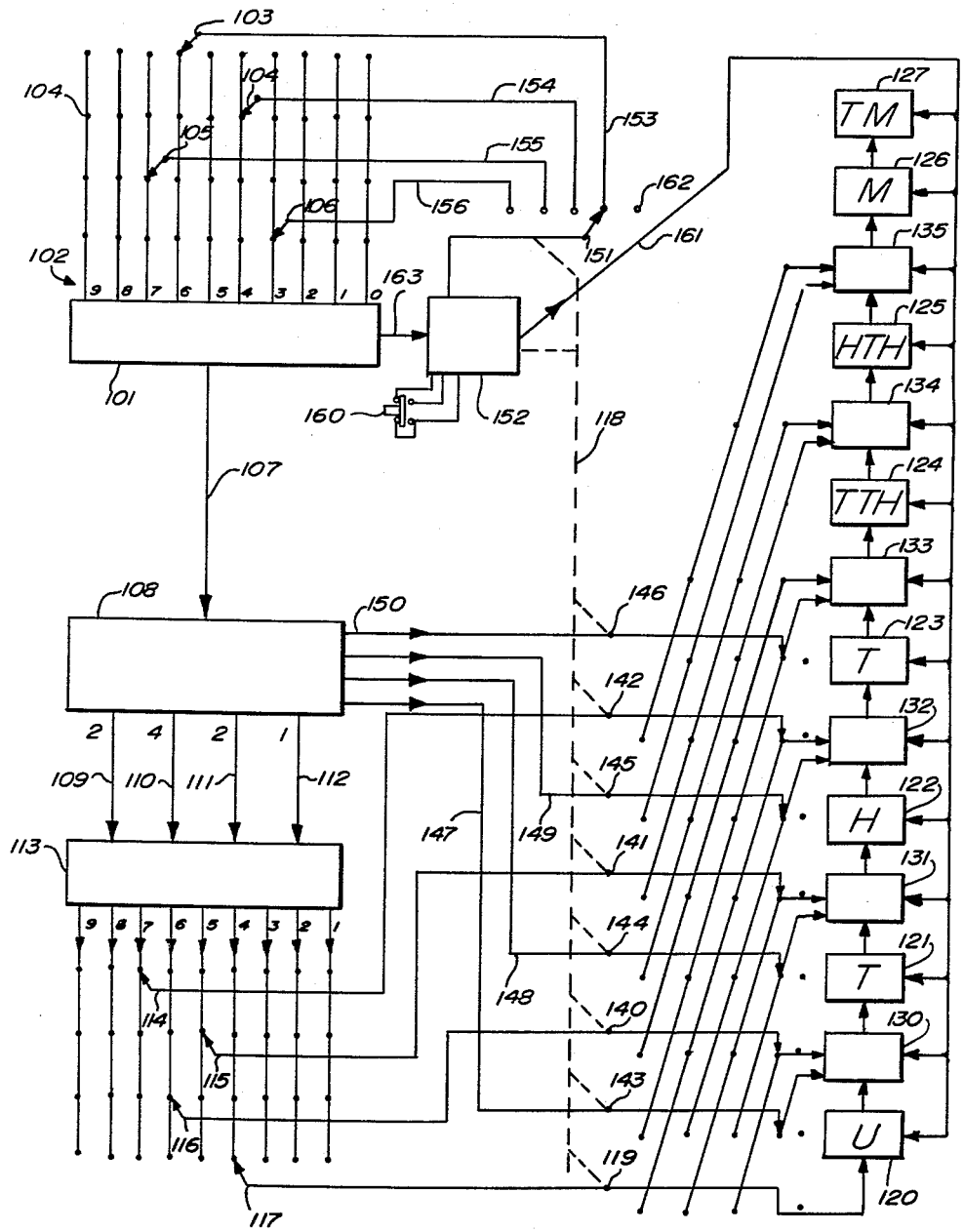
Fig. II

Nov. 22, 1960  R. E. BELL ET AL  2,961,160
ELECTRONIC MULTIPLIER
Filed May 28, 1956  9 Sheets-Sheet 3
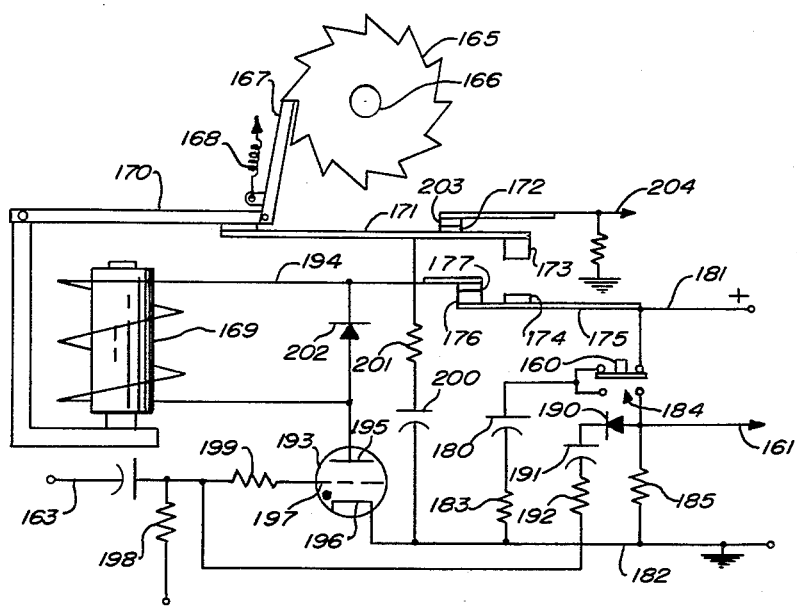
_Fig. III_
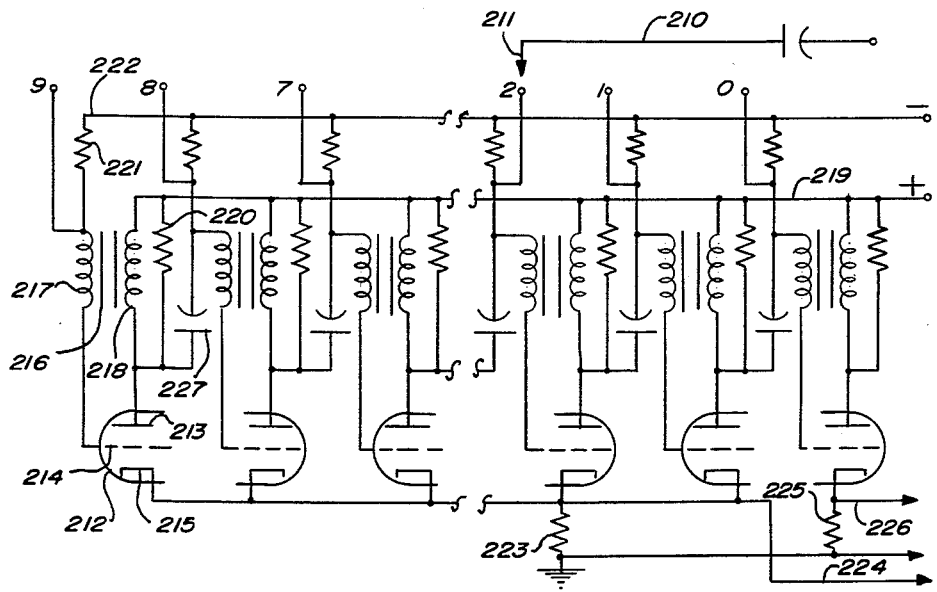
_Fig. IV_
INVENTORS
ROBERT E. BELL
MAYNARD C. YEASTING
BY
Marshall, Marshall & Yeasting
ATTORNEYS

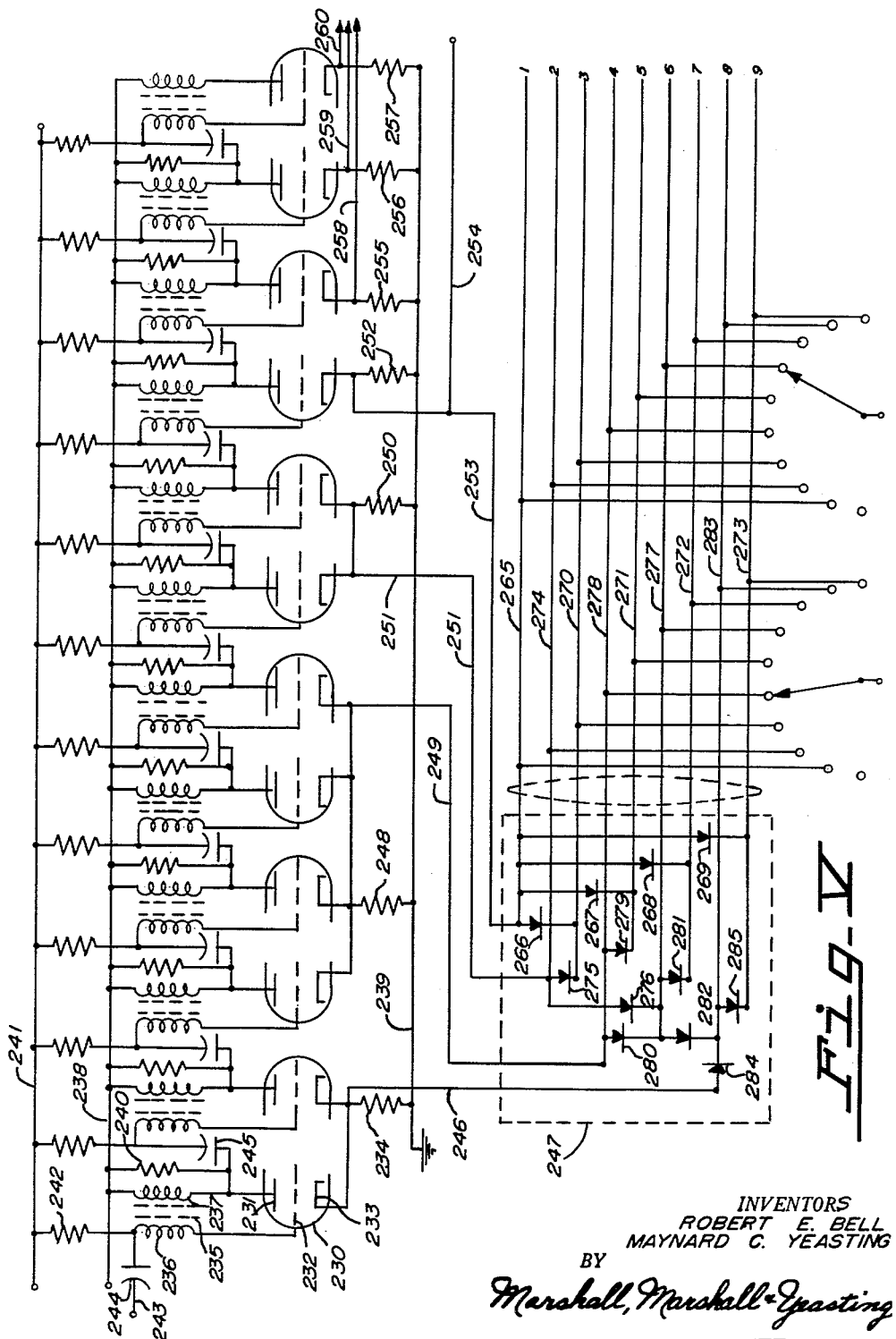
Fig. IV

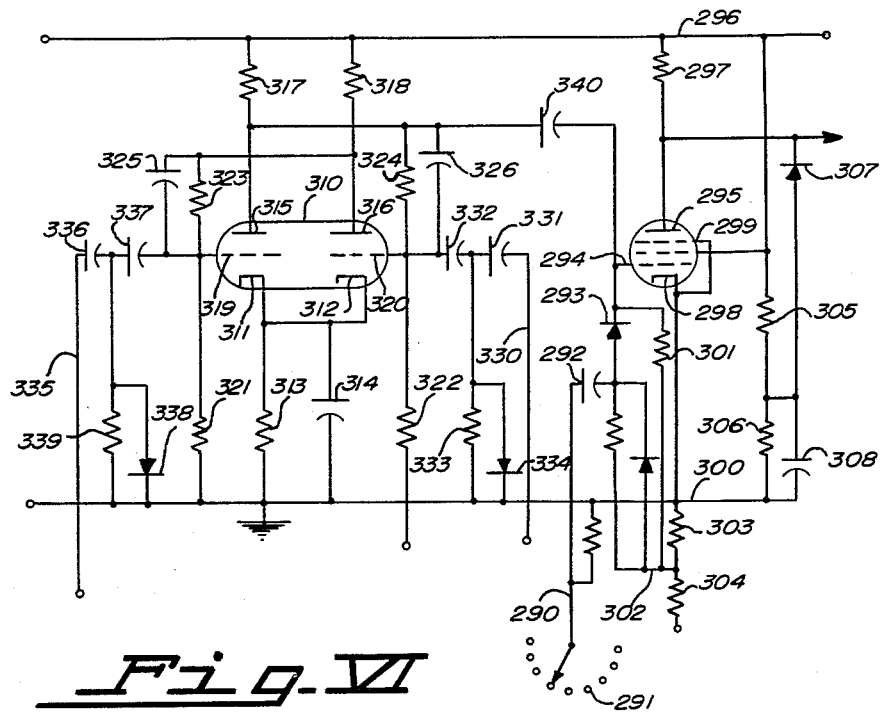
_Fig. VI_
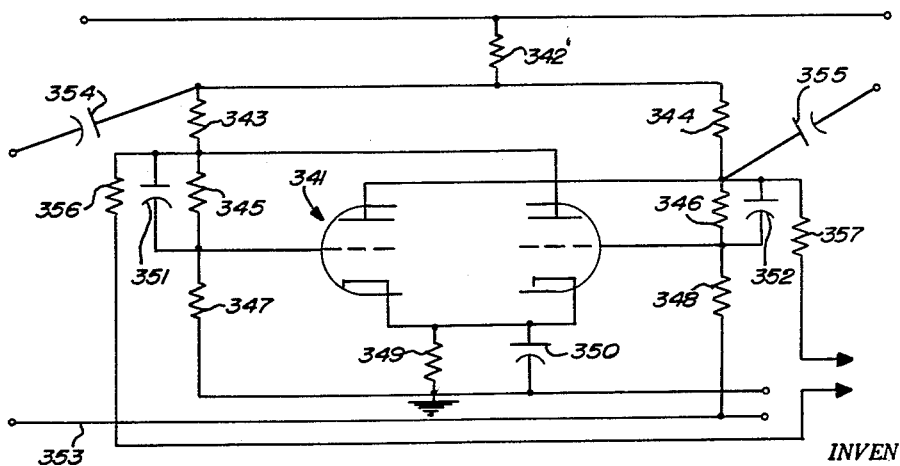
_Fig. VII_
INVENTORS
ROBERT E. BELL
MAYNARD C. YEASTING
BY
Marshall, Marshall & Yeasting
ATTORNEYS

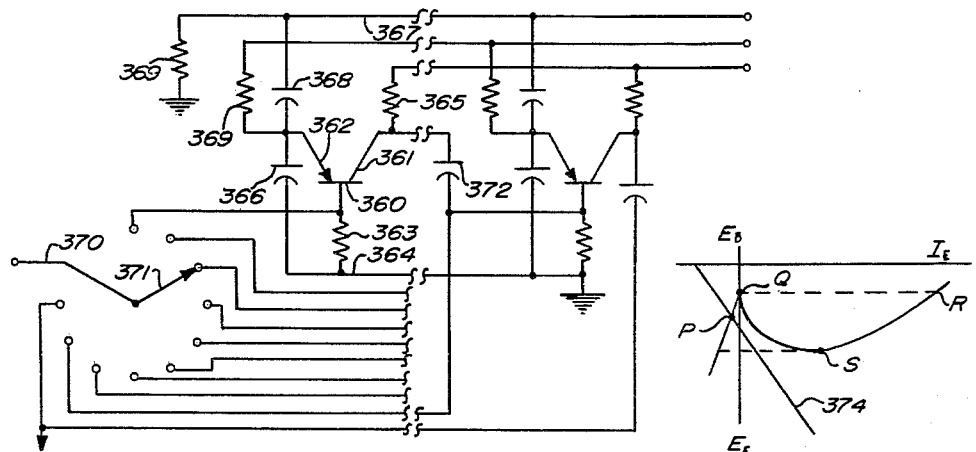
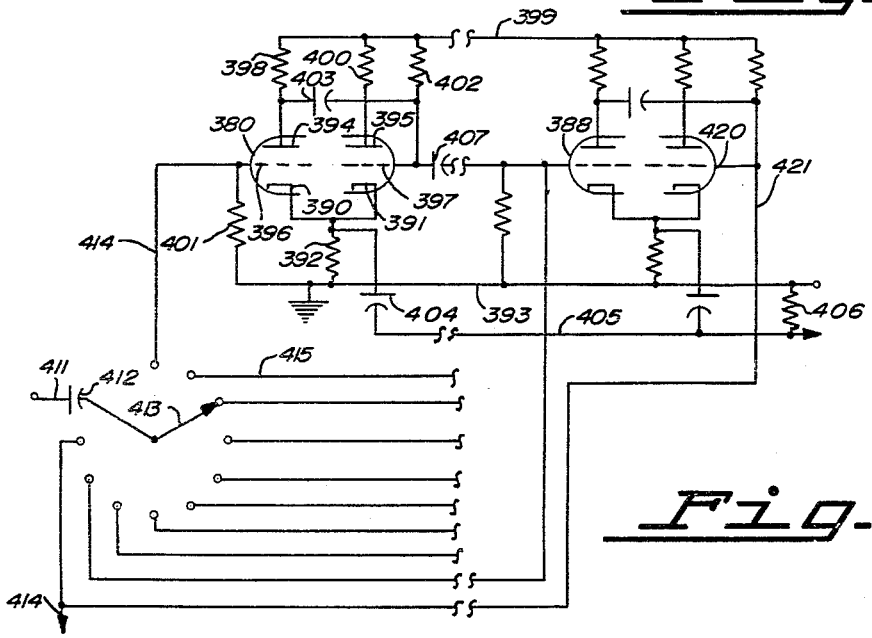
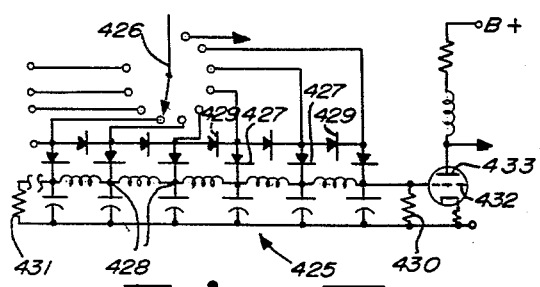

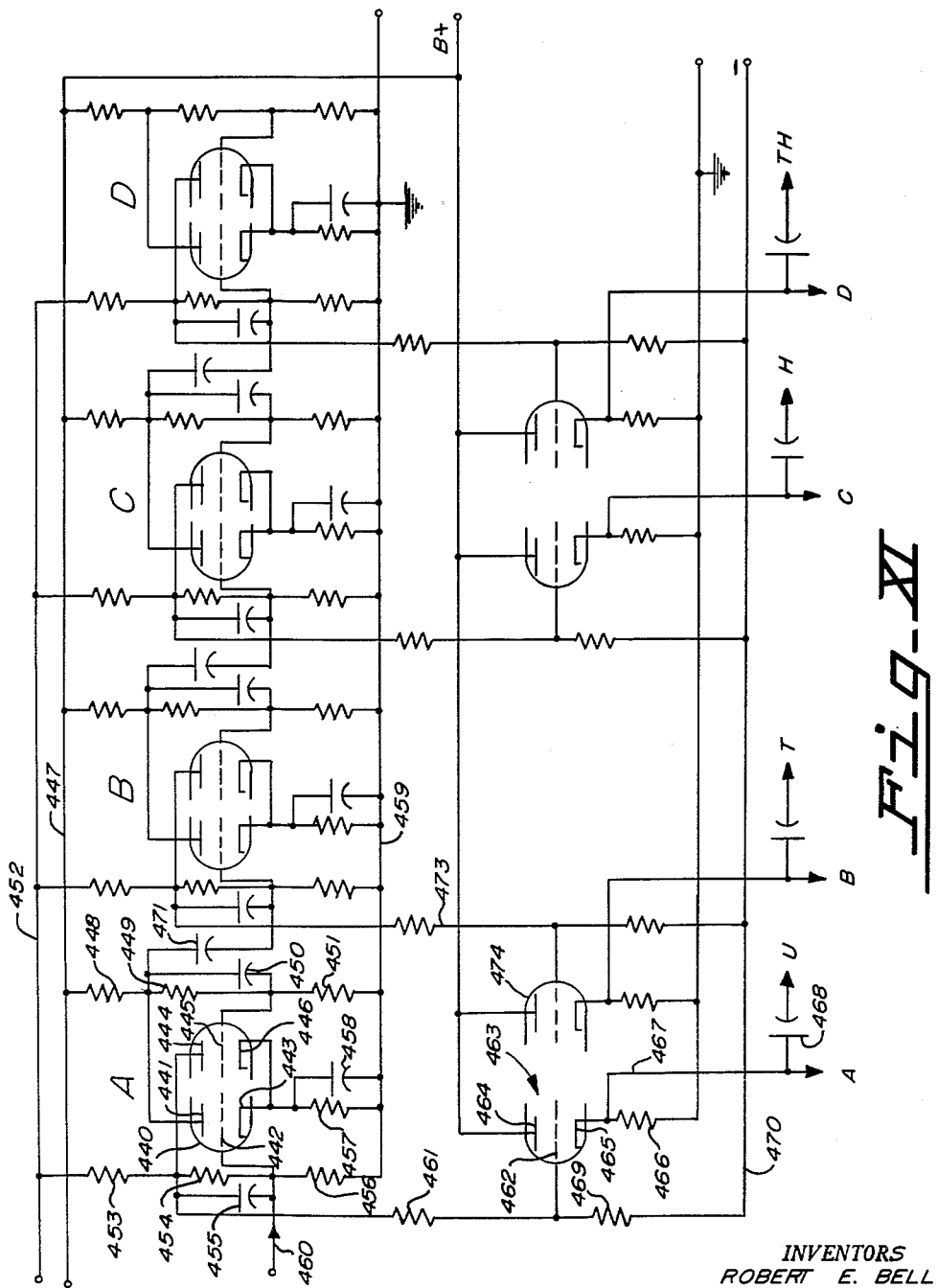

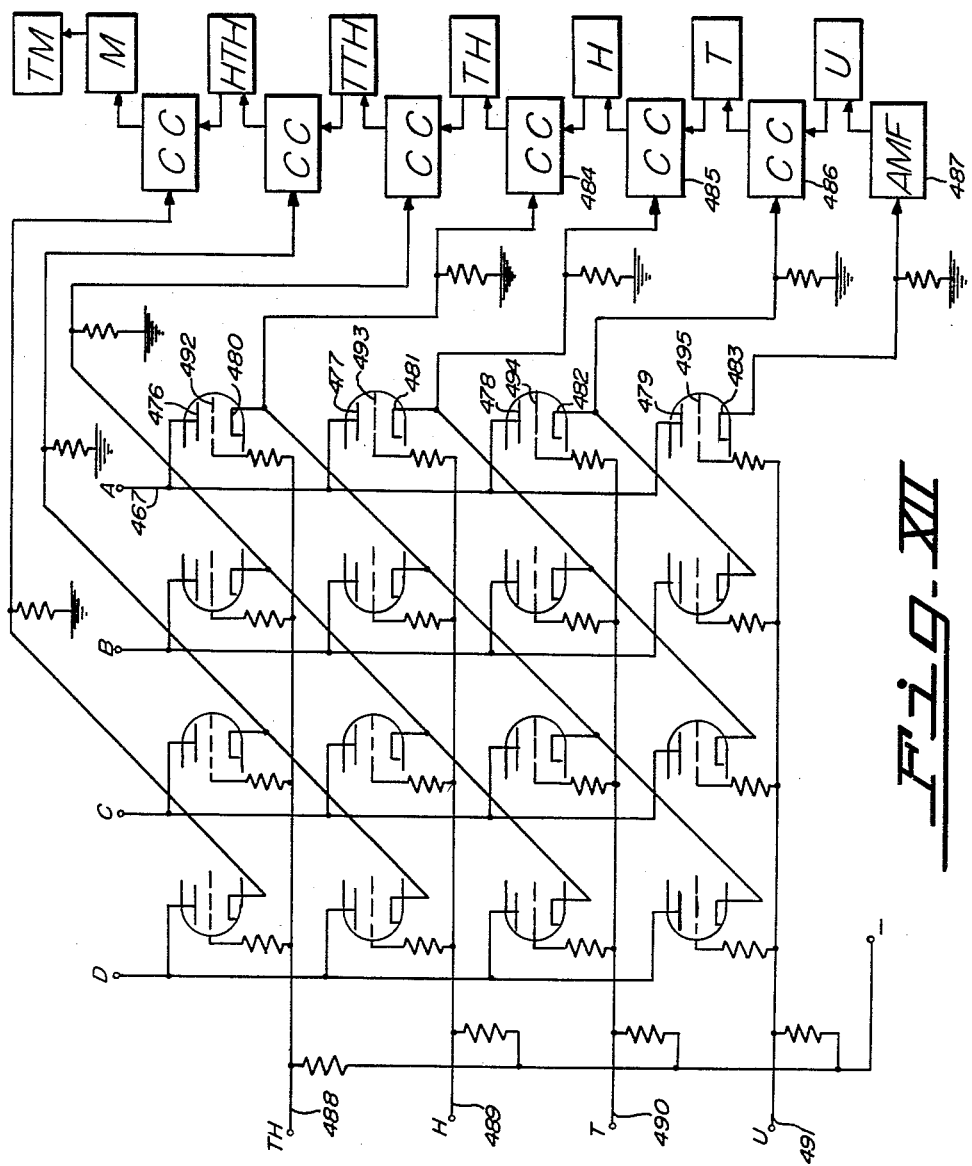
Fig. XII

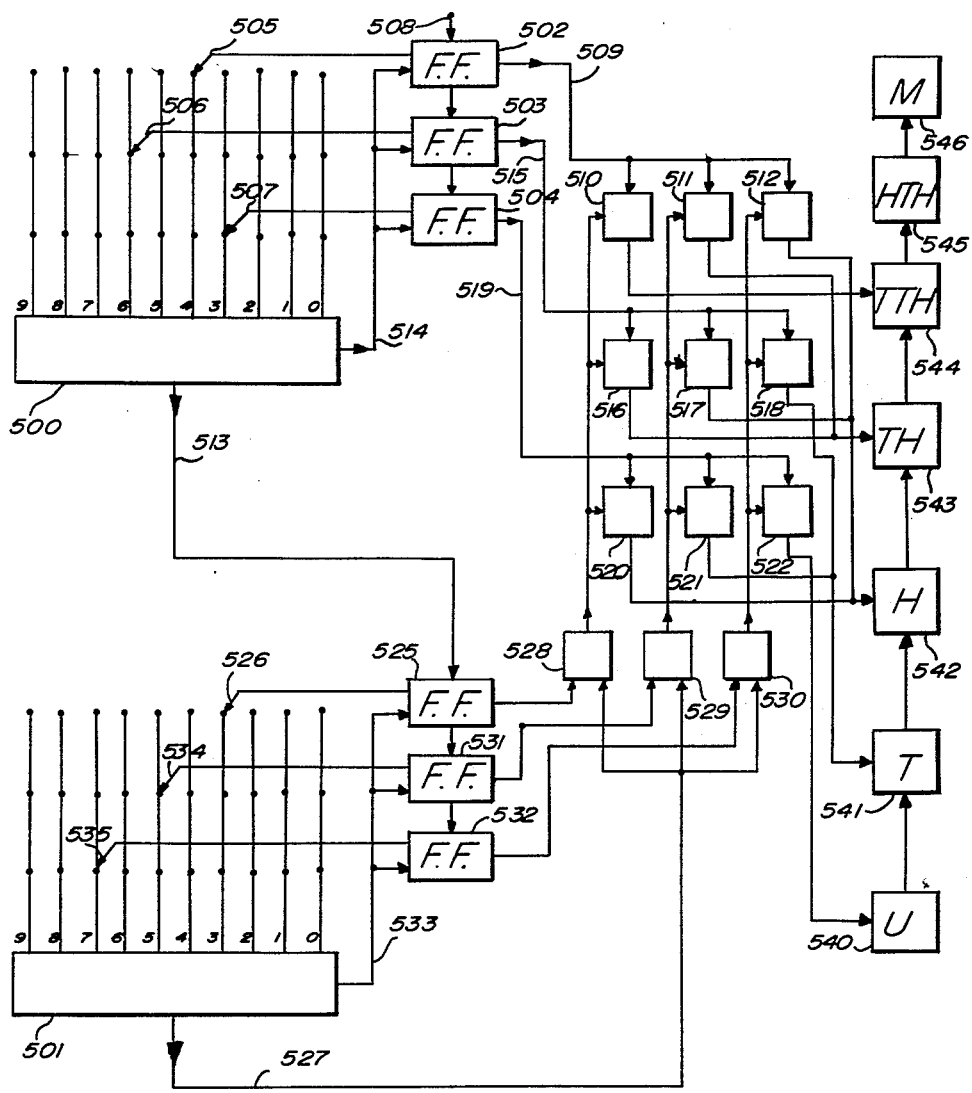
Fig. XIII

United States Patent Office 2,961,160
Patented Nov. 22, 1960

2,961,160

ELECTRONIC MULTIPLIER

Robert E. Bell, Toledo, and Maynard C. Yeasting, Elmore, Ohio, assignors, by mesne assignments, to Toledo Scale Corporation, Toledo, Ohio, a corporation of Ohio Filed May 28, 1956, Ser. No. 587,684

8 Claims. (Cl. 235—160)

This invention relates to computing equipment and in particular to electronic multiplying mechanism that operates entirely on pulse counting methods.

Mechanical methods for multiplication such as the ordinary desk computing and accounting machines are relatively slow in operation. The more complicated types of mechanical multipliers working on the partial product principle are capable of multiplying two, five or six digit numbers in approximately three seconds. Other types using the successive addition method require considerably longer time to perform a comparable multiplication operation. Electronic computing equipment has been constructed using electronic circuits to achieve extremely rapid or high speed operation in which multi-digit numbers are multiplied in a millisecond or less. These ultra fast or high speed computers are in general extremely expensive and complicated and require the services of highly trained personnel to operate and maintain them.

The electronic multiplier according to this invention is intended to supply or fill the gap between the slow speed mechanical types of multipliers and the extremely high speed electronic multipliers. It has the simplicity and direct action of a mechanical multipliers combined with the speed of electronic counters capable of operating in the neighborhood of a hundred thousand counts per second. In order to secure simplicity and freedom from highly complex synchronizing problems the improved counter operates on pulse techniques in which pulses representing the various digits of the multiplier and multiplicand are generated and added in successive stages or decades of an electronic counter. By counting pulses in a decimal system rather than performing the multiplication by the binary pulse train method it is possible to secure considerable reduction in complexity in the equipment as well as increased reliability in operation.

The principal object of this invention is to provide a simple, electronic multiplying circuit and apparatus that is relatively simple to construct, reliable in operation, and fast enough for all ordinary commercial applications.

Another object of the invention is to provide improved pulse generating equipment that can reliably produce selected numbers of pulses at various repetition rates suitable for counting in electronic counters.

A still further object of the invention is to provide improved switching mechanism for transmitting the pulses generated in the pulse generators to the respective decades of a multi-decade electronic counter to effect column shift of the input to the counter.

A still further object of the invention is to provide a simple electro-mechanical switching device and circuit for successively switching the outputs of the pulse generators to various decades of the electronic counter to perform the column shift operation utilized in most multiplying operations.

More specific objects and advantages will be apparent from the following description of preferred forms of the invention.

According to the invention the improved electronic multiplier comprises first generating means for generating a series of pulses representing a multiplier, a multiplicand pulse generator that is repetitively triggered by the pulses from the first pulse generating means, at least one output circuit from the multiplicand pulse generator, switching means settable according to the value of the multiplicand connected to the multiplicand generator to regulate the number of pulses appearing on the output circuit for each first generating means pulse, and an electronic counter for counting the pulses appearing on said output circuit.

Preferred forms of the invention are illustrated in the accompanying drawings.

In the drawings:

Figure I is a block diagram illustrating the general organization of the multiplier including the switching that is necessary for the introduction of the multiplier and multiplicand factors.

Figure II is a block diagram illustrating a form of the invention in which a stepping relay is employed to provide a column shift operation for repetitive use of the multiplier and multiplicand generators as multiplication by each digit of the multiplier is completed.

Figure III is a schematic diagram of a circuit for operating the stepping relay shown in Figure II.

Figure IV is a schematic diagram of a portion of one of the pulse generators illustrated or used in the circuits shown in Figures II and II.

Figure V is a schematic diagram of another of the pulse generators and signal combining matrix that is used in the multiplier systems illustrated in Figures I and II.

Figure VI is a schematic diagram illustrating the carry pulse storage system and amplifier that is employed between successive decades of the electronic counter.

Figure VII is a schematic diagram of one stage of a multi-stage electronic counter suitable for use in the system.

Figure VIII is a schematic diagram of another type of pulse generator suitable for use in the system.

Figure VIIIa is a diagram of the wave forms obtained in the circuit shown in Figure VIII.

Figure IX is a schematic diagram of a portion of another type of pulse generator suitable for use in the system.

Figure X shows another form of pulse generator that may be used and substituted for those illustrated in Figures I and II.

Figure XI is a schematic diagram of an electronic sequencing control for operating the computer shown in Figure II.

Figure XII is a schematic diagram of a suitable form of electronic switching or gating circuit for use with the sequencing control circuit.

Figure XIII is a block diagram of another circuit suitable for multiplying by the pulse counting technique.

These specific figures and the accompanying description are intended merely to illustrate the invention and not impose limitations on the claims.

In the circuit illustrated in Figure I, a start pulse which may be a positive spike of voltage is supplied through an input line 1 and a selector switch 2 into any of ten leads associated with a first or units pulse generator 3. The pulse generator 3 comprises a plurality of single cycle oscillators arranged in series or cascade connection such that the pulse from the input lead 1 triggers a selected one of the oscillators which in turn triggers its neighbor and so on to the end of the series. As each of these oscillators triggers it provides a pulse on a units output lead 4 and as the last oscillator of the chain or series executes its cycle of oscillation it produces a pulse on a second or terminal pulse output lead 5. The lead 5 is connected to a selector switch 6 associated with a second pulse generator 7 for the tens digit of the multiplier. The selected number of "tens" pulses are delivered through an output lead 8 and a terminal pulse through a lead 9 that is connected through a selector switch 10 to a third pulse generator 11 representing the hundreds digit of the multiplier.

The hundreds pulse generator 11 is similar to the others and delivers the selected number of pulses over its output lead 12 and its terminal pulse over its output lead 13. The terminal pulse on lead 13 is transmitted through a selector switch 14 associated with a fourth pulse generator 15 representing the thousands digit of the multiplier. The thousands pulse generator 15 is similar to the others and delivers its selected number of pulses over its output lead 16 and if there are more places in the multiplier it delivers a terminal output pulse through a lead 17 which would be connected to the next pulse generator in the series.

The pulse generators 3, 7, 11, and 15 constitute means for generating series of pulses representing the various digits of a multiplier. While the system has been shown to operate on a decimal arrangement it is possible and in some cases preferable to generate all of the multiplier pulses in a single pulse generator as a continuous series proportional in number to the factor. This is particularly true where the multiplier is a factor representing the reading of a condition responsive instrument, for example a weighing scale, and in which the factor is obtained by scanning or otherwise interpreting a graduated chart. Likewise, while the system is shown as a decimal arrangement other units also can be used such as a duodecimal or octal system by merely changing the number of impulses to be generated as the pulse is transmitted through each oscillator chain.

The output pulses from the units pulse generator 3 delivered through the output lead 4 are applied to a multiplicand pulse generator 20 that comprises a plurality of single cycle oscillators arranged in groups and each executing a complete cycle of operation for each input pulse received on the lead 4. The groups of oscillators in the generator 20 are arranged such that a first output lead 21 delivers two pulses for each input pulse, a second output lead 22 delivers four pulses for each input pulse while a third output lead 23 delivers two pulses for each input pulse and a fourth output lead 24 delivers a single output pulse for each input pulse. In addition four pulses are generated and delivered one through each of output leads 25, 26, 27, and 28 which are connected through a cable 29 to effect clearing of certain carry storage circuits of an electronic counter arranged to indicate the product or result of the computation. The pulses delivered on the output leads 21 to 28 inclusive are sequential in time in that the pulses on the lead 21 are the first two pulses to be generated following the receipt of a pulse over the lead 4, the next four pulses to be generated appear on the lead 22, the next two on the lead 23, the next one on the lead 24, and the following four pulses on the leads 25 to 28 inclusive. As a matter of expediency the pulse on the leads 24 to 25 may be the same pulse since the counter uses the leading edge of the voltage pulse while the carry storage circuit uses the trailing edge.

The pulses appearing on the leads 21 to 24 inclusive are fed through a diode matrix combining circuit 30 which has nine output leads 31 carried in a cable 32 and arranged to supply nine terminals of each of a set of selector switches 33, 34, 35, and 36. The selector switches correspond to the thousands, hundreds, tens and units places of a multiplicand. The output leads 31 from the diode matrix 30 receive, through the switching diodes from the leads 21 to 24, a number of pulses corresponding to their place in the series. Thus the first of the leads 31 carries a single pulse per input pulse on the lead 4 while the last of the leads 31 carries nine pulses per input pulse.

By properly setting the selector switches 33 to 36 according to the digits of the multiplicand, corresponding numbers of pulses are fed to the output leads of the various selector switches. Thus as shown the units switch 36 is connected to the fifth point of the switch 36 so as to deliver five pulses through its output lead 37 for each pulse received over the lead 4 into the generator 20. These pulses on the lead 37 are fed through an amplifier 38 into a units decade 39 of a product counter 40.

In this manner the units decade 39 receives five pulses for each pulse on the lead 4 which in turn receives four pulses for each pulse on the starting pulse lead 1. Thus with the multiplier units figure set at four and the multiplicand unit set at five a total of 20 pulses are applied through the lead 37 and amplifier 38 to the unit decade 39. The capacity of the unit decade 39 is ten counts, i.e. it resets to zero on the tenth count and provides a carry pulse for the next decade of the counter. To avoid any possible interference in the various decades of the counter the carry pulses from each decade is stored in a separate carry storage circuit such as circuit 41 shown connected between the units and tens decades 39 and 42 of the electronic product counter 40. This storage circuit is cleared at the end of each series of pulses corresponding to a single pulse on lead 4. Thus at the end of the second train of pulses through the pulse generator 20 ten pulses would have been applied through the lead 37 and amplifier 38 to unit decade 39. These would result in resetting the unit decade to zero and transmitting a carry pulse through lead 43 into the storage circuit 41. The carry storage is arranged to transmit the stored carry pulse through its output lead 44 at the end of the series of pulses through the pulse generator 20 during which the carry occurred. Thus in response to a pulse from the lead 4 the generator 20 generates the nine pulses appearing on the leads 31 and then four additional pulses, the four pulses appearing on the leads 25 to 28. The pulse appearing on the lead 25 is transmitted through the cable 29 and lead 25 to the carry storage circuit 41 to trip it and cause it to transmit the stored pulse into the next counter 42. Since the pulse on the lead 25 occurs after the series of pulses used to count there is no interference in time between the actual counting pulses and the clearing pulse. The third and fourth pulses on lead 4 produce corresponding series of pulses in generator 20 and matrix 30 resulting in ten additional pulses delivered over lead 37 and amplifier 38 to the first decade 39 thus repeating one complete cycle of this decade and providing a second pulse into the tens counter 42. Without considering more this much of the circuit has multiplied the units digits of the multiplier and multiplicand to provide the partial product resulting from these two digits.

Simultaneously with the transmission of pulses through the selector switch 36 pulses are transmitted through output lead 45 of the tens selector switch 35 to the amplifier of the carry storage circuit 41 and from the amplifier directly to the tens decade 42. As shown, the tens selector switch is set on a second point representing 2 so that two pulses are thus transmitted directly to the amplifier of the carry storage 41 and thence to the tens decade 42 for each pulse received from the units multiplier 3. Simultaneously the pulses are transmitted to the hundreds selector switch 34, which is shown set at the third position to transmit three pulses per pulse, through its output lead 46 to a second carry storage circuit 47 that is interposed between the tens and hundreds decades of the counter 40. These pulses are thus fed directly into hundreds decade 50 of the product counter. The carry storage circuit 47 between the tens and hundreds decade is cleared by the second clearing pulse delivered from the pulse generator 20 through its output terminal or lead 26. At the same time, pulses are selected by the thousands selector switch 33, shown set at its number 6 position to deliver six pulses per pulse through its output lead 48 leading to a carry storage circuit 49 interposed between the hundreds decade 50 of the product counter and a thousands decade 51. Thus these pulses resulting from the units multiplier generator 3 and the thousands selector switch 33 are applied directly to the thousands decade 51 of the product counter 40.

The carry storage clearing pulses appearing on leads 25, 26, 27, and 28 are applied to the carry storage circuits 41, 47, 49, and 52 respectively in timed sequence as named so that the carries from decade to decade are correctly completed even though a nine may be registered in one of the decades in the series such that the addition of a carry pulse would cause it to reset to zero and transmit a carry pulse into the next storage circuit. Since the clearing pulses come in sequence the carry pulses produced as a result of a previous carry are thus correctly transmitted through the storage circuits to the following counter decades.

Thus in this arrangement at the end of the series of pulses delivered by the pulse generator 3 over its output lead 4 representing the units digit of a multiplier result after transmission and multiplication through the multiplicand generator 20 and its selector switches 33 to 36 inclusive in registering the partial product of the units multiplier digit times the entire multiplicand in the corresponding decades of the product counter 40.

As the units multiplier generator 3 completes its cycle of operation and transmits a pulse over its output lead 5 to the tens multiplier generator 7 it begins its cycle of operation and generates a series of pulses corresponding to the tens digit of the multiplier and transmits such pulses through its output lead 8 to a multiplicand generator 53 associated with the tens multiplier digit. The multiplicand generator 53 is similar to the generator 20 associated with the units digit of the multiplier and generates an invariable series of pulses which after switching in a diode matrix switching circuit 54 appear on a cable 55 connected to the respective points of a plurality of selector switches 56, 57, 58, and 59. The selector switch 56 is gang connected to the thousands selector switch 33 associated with the units generator while the selector switch 57 is associated with the switch 34 and the switch 58 with the switch 35 and likewise the switch 59 with the units switch 36. The tens multiplier pulses fed through the output lead 8 and generator 53 to the selector switches result in the desired or selected number of pulses appearing on the selector switch 59 representing the product of the units digit of the multiplicand times the tens digit of the multiplier. These pulses are transmitted from the selector switch 59 to the lead 45 and thence through the amplifier of the carry circuit 41 for transmission to the tens decade 42 of the counter. Simultaneously the tens digit of the multiplicand and the tens digit of the multiplier result in pulses appearing in lead 46 from the selector switch 58 which are transmitted directly through the carry circuit 47 to the hundreds decade 50 of the product counter. Likewise the hundreds figure of the multiplicand and the tens figure of the multiplier are combined through the selector switch 57 so that these pulses appear on the lead 48 which is connected through the amplifier in the carry circuit 49 to feed the thousands decade 51 of the product counter 40. Finally the pulses representing the product of the tens digit of the multiplier times the thousands digit of the multiplicand appear on the output selector switch 56 and are transmitted through the lead 60 which feeds the carry circuit 52 for transmission into a ten thousands decade 61 of the product counter 40.

As was the case with the multiplier generator 20 the sequence of pulses generated in the generator 53 for each pulse received over the lead 8 include pulses appearing at the trailing end of the sequence on leads 62, 63, 64, and 65. These output leads are connected to the cable 29, the lead 62 being conductively coupled to the lead 26 for clearing the carry circuit 47, the lead 63 being conductively coupled to the lead 27 for clearing the circuit 49, the lead 64 being coupled to the lead 28 for clearing the circuit 52, and the fourth lead 65 being connected to clear a carry circuit 66 interposed between the ten thousands decade 61 and hundred thousands decade 67 of the product counter 40. Thus the series of pulses resulting from the operation of the tens multiplier digit generator 7 and transmitted through the lead 8 result in introducing or adding into the product counter the partial product resulting from the tens digit of the multiplier times the entire multiplicand. This partial product is added into the product counter as it is computed so as to leave the product counter at the end of this sequence of pulses with the sum of the first two partial products registered therein.

The terminal output pulse from the tens multiplier digit generator 7 transmitted through its lead 9 to the selector switch 10 causes the hundreds multiplier pulse generator 11 to generate a selected number of pulses which are transmitted through the lead 12 to a hundreds multiplicand generator 68 which like the generators 20 and 53 supplies a plurality of pulses to diode matrix 69 which feeds selector switches 70, 71, 72, and 73. The switch 70 is ganged along with the switches 56 and 33 for registering the thousands digit of the multiplicand. Likewise the selector switch 71 is ganged with the switches 57 and 34 of the hundreds digit of the multiplicand, the switch 72 is ganged with the switches 58 and 35 for the tens digit, and the remaining selector switch 73 is ganged with the switches 59 and 36 for registering the units figure of the multiplicand in the generation of the hundreds partial products. The arm of the selector switch 73 which carries pulses representing the product of the hundreds digit of the multiplier times the units digit of the multiplicand is connected to the lead 46 that feeds pulses through the amplifier and carry circuit 47 to the hundreds decade 50 of the counter 40. Likewise the output lead of the tens switch 72 is connected to the lead 48 for feeding pulses to the thousands decade 51 of the counter while the hundreds switch 71 is connected to the lead 60 to feed the pulses to the ten thousands decade of the counter. The thousands switch 70 has its output lead 74 connected to feed pulses to the carry circuit 66 for transmission into the hundred thousands decade 67 of the product counter 40.

Similar action occurs for the thousands multiplier digit the pulses being generated in the thousands multiplier generator 15 and transmitted through its output lead 16 to the thousands multiplicand generator 76 which like the generators 68, 53, and 20 feed pulses into a diode switching circuit 77 for energizing selector switches 78, 79, 80, and 81 that are ganged into the multiplicand switching system representing the thousands, hundreds, tens, and units places respectively. The output of the units switch 81 is connected through the lead 48 to feed pulses to the thousands decade 51 of the product counter 40 while the tens decade 80 is connected to the lead 60 for feeding pulses to the ten thousands decade 61 while the hundreds switch 79 is connected to the lead 74 for feeding pulses representing the thousands digit of the multiplier times the hundreds digit of the multiplicand into hundred thousands decades 67 of the product counter. The last selector switch 78 has its output connected through lead 82 and amplifier and carry circuit 83 to feed pulses into a millions decade 84 of the product counter 40. Carry pulses from the millions decade 84 are transmitted directly to a ten millions decade 85 of the counter without the interposition of a carry circuit because the ten millions decade of the counter counts only carry pulses.

The multipliers 68 and 76 also provide pulses to the carry circuits so as to clear the respective carry circuits after each series of pulses resulting from each pulse received through the leads 12 and 16. Thus the generator 68 has output leads 86, 87, 88, and 89, the lead 86 being connected in parallel or conductive relation to the leads 63 and 27 for clearing the carry circuit 49. Likewise the output lead 87 is directly connected to the output leads 64 and 28 for clearing the carry circuit 52. Likewise the lead 88 is connected to the lead 65 for clearing the carry circuit 66 while the lead 89 is connected directly to the carry circuit 83. The thousands multiplier 76 has three such output leads 90, 91, and 92 that are connected in parallel with the output leads 87, 88, and 89 respectively. The fourth lead from the generator 76 is not required unless there are more stages to be added, that is, more digits in the multiplier factor inasmuch as the fourth lead, if used, would be for the carry circuit to operate between the million and ten millions decades 84 and 85.

It is also believed clear that if more factors are to be accommodated in the multiplier and multiplicand that more carry circuits would be involved in each operation for each digit of the multiplier and hence an additional number of output leads would be required from each of the multiplicand generators 20, 53, 68, and 76.

If it be assumed that the electronic counters in the product counter 40 have a maximum operating speed of one hundred thousand cycles per second the operating speed of the various pulse generators will be limited thereby. Thus the pulses from the generators 20, 53, 68, and 76 are counted directly and therefore these pulses must not occur at a repetition rate greater than one hundred thousand cycles per second. With the four decade capacity as illustrated each of these generators must generate twelve pulses for each pulse received from the multiplier pulse generators. Thus twelve time intervals each of one one hundred thousandth second duration is required for each of these operations. Since the pulse generators 20, 53, 68, and 76 must each complete their cycle of operation, generating their twelve pulses for each input pulse received from the multiplier generator it is clear that the pulses from the multiplier generators received over the leads 4, 8, 12, and 16 must not occur at intervals less than twelve hundred thousandths of a second. In other words the maximum pulse repetition frequency of the multiplier generators must not be greater than 8,330 cycles per second. As a safety margin the pulse generators 3, 7, 11, and 15 should be designed to generate pulses at approximately 6,000 cycles per second. The time required for each of the multiplier pulse generators to generate its sequence of pulses is thus determined by its rate of approximately 6,000 cycles per second times the number of pulses to be generated. Thus if the generator is to deliver nine pulses it would require about one and one-half milliseconds or the total time for the four generators if the multiplier factor were 9999 would be about 6.6 milliseconds total.

Any reduction in the size of the numbers in the multiplier would of course reduce the time required for one operation. Thus if the multiplier were 1,111 it would require only eight cycles of 6,000 cycle frequency or slightly more than one millisecond for the multiplying operation. Eight cycles are required, two from each multiplier, one over the lead to the multiplicand generator and one to trigger the next multiplier generator.

As is conventional in the operation of electronic counters a reset circuit is provided which extends from lead 93 to each of the decades of the electronic product counter 40 and to each of its carry circuits so as to insure when the reset signal is given that each of the counter stages is set to zero and that any carry pulses stored in the carry storage circuits are also cleared so as to prevent an erroneous indication.

The multiplier illustrated in Figure I may be said to operate on a series-parallel method because the multiplier pulses are fed through the series of multipliers in a serial fashion wherein each of the generators generates its selected number of pulses before transmitting a start pulse to the succeeding pulse generator. The output pulses of the multiplier pulse generators are fed to the multiplicand generators and in parallel from the output of this generator through the selector switches to the corresponding decades of the electronic counter. Thus these decades operate for the parallel reception of information on counts thus minimizing the time required for the multiplying operation. Parallel operation is not feasible for the multiplier pulses, however, because of the vastly increased number of carry storage circuits that would be required to keep track of the carry track of the carry pulses and keep the various pulses properly separated. As it is set up in the circuit of Figure I this interference is avoided with the use of only one series of carry storage circuits between the various counter decades inasmuch as the carry pulses may be cleared after each multiplier pulse applied to the corresponding generator.

The circuit illustrated in Figure I avoids the use of any switching or gating circuits during a multiplying operation. This is accomplished without too much sacrifice in speed since the maximum computation time is in the order of six milliseconds, a time very short in comparison with the time required for a human operator to enter the multiplicand and multiplier factors into the keyboards for operating the respective selector switches. The circuit may be simplified as far as the number of components is concerned by employing a stepping relay or switching or gating circuits for routing the pulses and thus repetitively use a single multiplier and multiplicand pulse generator rather than the four shown in Figure I. When this is done a single multiplicand generator such as the generator 20 is sufficient and one series of output selector switches. It is of course necessary that the outputs of the selector switches be switched to the corresponding counter decades as the starting pulses are switched or reintroduced into the multiplier pulse generator according to the decade place values of the multiplier.

A circuit arrangement utilizing this method of operation is illustrated in Figure II. While this system has considerably fewer components it is limited in speed by the speed of the stepping relay. In the system shown in Figure II a multiplier pulse generator 101 is provided with input leads 102 which are ten in number corresponding to the digits zero to 9 inclusive. The input leads 102 are connected to selector switches including a units selector switch 103, a tens selector switch 104, a hundreds switch 105, and a thousands switch 106. The output pulses from the pulse generator 101 are fed through a lead 107 to a multiplicand pulse generator 108 which generates a series of at least 12 pulses for each input pulse from the lead 107. The pulse generator 108 corresponds in function to the generators 20, 53, 68, and 76 shown in Figure I. The first nine of the pulses generated in the generator 108 appear, two on an output lead 109, four on an output lead 110, two on an output lead 111, and one on an output lead 112. These pulses are fed into a diode matrix switching circuit 113 the output of which consists of nine leads that feed a series of selector switches including switch 114 for the thousands digit of a multiplicand factor, switch 115 for the hundreds figure or digit, switch 116 for the tens digit, and switch 117 for the units digit of the multiplicand.

The output leads from the multiplicand selector switches 114, 115, 116, and 117 are fed through respective levels or decks of a stepping switch 118. The output pulses from the units selector switch 117 of the multiplicand circuit transmits its pulses into a first deck or section 119 of the stepping switch or stepping relay 118 which in its first position transmits the pulses directly to a units decade 120 of a product counter comprising the units decade 120, a tens decade 121, a hundreds decade 122, a thousands decade 123, a ten thousands decade 124, a hundred thousands decade 125, a millions decade 126, and a ten millions decade 127.

Carry storage circuits 130, 131, 132, 133, 134, and 135 are interposed between the various decades of the product counter with the first of these 130 interposed between the units and tens decades. There is no such carry circuit between the millions and ten millions decades since the ten millions decade counts carry pulses only.

The stepping relay 118 used in this circuit as shown in Figure II has a total of nine decks or separate switching levels. Four of these decks including the units deck 119, a tens deck 140, a hundreds deck 141, and a thousands deck 142 are fed from the multiplicand selector switches 117, 116, 115, and 114 respectively. The next four decks or switching circuits 143, 144, 145, and 146 of the relay are fed from clearing pulse output leads 147 to 150 respectively of the multiplicand pulse generator 108. The pulse on the lead 147 is the same as the last of the pulses appearing on the leads 109 and 112 inclusive. The others of the output leads 148, 149, and 150 have pulses that follow sequentially in time for a stepwise clearing of the carry circuits in progressive order so that no carry pulses will be lost if a carry pulse delivered to one counter decade should cause a carry into the next decade.

A ninth level or deck 151 of the stepping relay 118 is arranged to feed pulses from a stepping relay drive circuit 152 selectively into lead 153 feeding the first multiplier selector switch 103, lead 154 for the tens multiplier switch 104, lead 155 for the hundreds selector switch 105, and lead 156 for the thousands selector switch 106.

In this arrangement the stepping relay successively connects the various selector switches for the multiplier and multiplicand factors and the proper product counter decades so that the same pulse generators may be used for each of the several places in the multiplier as the operation proceeds.

As shown in Figure II the multiplicand selector switches are set for a multiplicand of 7,564 while the multiplier switches are set for a multiplier factor of 3,746. After the selector switches have been set to the desired multiplicand and multiplier factors a multiplication operation is started by momentary depression of a start button 160. The start button 160 by means of a circuit illustrated in Figure III produces a reset pulse on a reset lead 161 that is fed to each of the counter decades as well as the carry circuits therebetween for resetting the counter and the carry circuits to zero in anticipation of or preparation for the multiplying operation. This cancels any previous computation results. At the start of an operation the stepping relay has its contacts one step behind the position shown in the drawing. That is the movable contact of the deck 151 is on an idle contact 162 and the other decks correspondingly positioned. The initial pulse provided by the start button 160 causes the first stepping operation of the stepping relay to advance all of the contacts to the position shown in the drawing and at the conclusion of such advance transmits a start pulse through the deck 151 and lead 153 to the selector switch 103 thereby feeding the pulse into the pulse generator 101 at the number six position. As this pulse is transmitted from oscillator to oscillator through the pulse generator 101, which comprises a series of single cycle oscillators, six pulses are delivered on the lead 107 and the final pulse or seventh pulse is delivered through an output lead 163 to the stepping relay circuit 152. Each of the six pulses delivered over the lead 107 from the pulse generator 101 in response to the signal received on the number 6 terminal produces a complete cycle of operation through the pulse generator 108 thereby delivering the predetermined number of pulses through the diode matrix to energize the multiplicand selector switches 114 to 117 inclusive. Thus each of the six pulses delivered through the lead 107 after transmission through the generator 108 produces four pulses on the output selector switch 117 for the units decade of the product counter. These four pulses are thus countered in the units stage and there being four such pulses for each of the six transmitted through the lead 107 provides a total of twenty-four pulses or the first of the partial products in the units stage.

These twenty-four pulses causes the units counter 120 to count to ten twice and each time transmit its carry pulse to the carry storage circuit 130. The carry storage circuit 130 is cleared at the end of each cycle of operation of the generator 108 by the voltage pulse delivered on the lead 147. Thus the conclusion of the six pulses on the lead 107 provides a total of twenty-four pulses in the first decade of the counter.

Simultaneously six pulses per pulse are delivered through the tens selector switch 116 and the carry circuit 130 to the tens decade 121. These pulses are in addition to the carry pulses and thus provide the partial product of the units multiplier factor times the tens multiplicand factor plus the carry from the units decade this being stored in the decade 121. At the same time five pulses per pulse are transmitted through the multiplicand selector 115 and switching level 141 and carry circuit 131 to the hundreds decade 122. And finally at the same time the hundreds selector switch 114 receives its seven pulses per input pulse on the lead 107 which are counted in the thousands decade 123. This completes the registration of the first of the partial products resulting from the multiplication of the multiplicand times the units figure of the multiplier.

At the conclusion of the six pulses, the seven pulse delivered through the lead 163 causes the stepping relay to advance one step and thus provide a starting pulse which is fed through the lead 154 and the tens selector switch 104 into the pulse generator 101. This connection provides four pulses on the lead 107. At the same time the stepping switch has advanced all of its contacts corresponding to the decades or levels 119, 140, 141, 142, 143, 144, 145, and 146 to the next step so as to effect the equivalent of a column shift or register shift so that the units switch 117 of the multiplicand is now connected to feed pulses into the tens decade of the product counter. The stepping relay also effects the proper switching for the remaining selector switches of the multiplicand circuit as well as the clearing pulses for clearing the carry storage circuits.

The remaining digits of the multiplier are handled in the same way since at the completion of each series of pulses the stepping relay is advanced to the next step in its cycle of operation. The final step after completing the thousands digit of the multiplier brings the wiper or movable contact of the deck 151 back into contact with the idle contact 162. Since the output pulse of the stepping relay is then delivered to an idle contact the complete operation stops with the product then totaled and indicated or registered in the various decades making up the product counter.

The timing of the pulses in the stepping relay is such that the output pulse delivered through the deck 151 occurs after the wipers or movable contacts of the other decks are all firmly in place and connected to the respective counter decades. Thus except for failure of contacts due to mechanical wear or dirt there can be no loss of pulses through the circuits.

The speed of operation of this circuit is determined almost entirely by the stepping relay since the time required for the generation through the generator 101 of nine pulses plus the output pulse on the lead 163 is ten cycles at a 6,000 cycle per second repetition rate which is one six hundredth of a second. Since the stepping relay requires a minimum of approximately one-sixieth of a second it is clear that the electronic portions of the circuit require only ten percent of the time per step and thus the stepping relay operates at practically its maximum or free running stepping speed which for ordinary stepping relays is in the order of 50 to 60 steps per second.

The drive circuits for the stepping relay operation are illustrated in detail in Figure III. As shown in this figure the stepping relay is provided with a ratchet wheel 165 that is mounted on a shaft 166 which may preferably carry the movable contacts or wipers of the various decks or levels of the stepping relay illustrated in Figure II. The stepping relay is advanced stepwise by operation of a pawl 167 that is urged in stepping direction by a spring 168 and which is cocked or preset tooth by tooth by operation of a solenoid 169 cooperating with an armature 170 upon which the pawl 167 is mounted. The armature 170 also carries an extension 171 having contact elements 172 and 173. The contact element 173 cooperates with the contact element 174 mounted on a resilient leaf 175. Contact element 176 also mounted on a leaf 175 cooperates with a stationary contact 177.

When the start button 160 is in its normal or undepressed condition as illustrated in Figure III is connects, through its normally closed contacts, a condenser 180 between a B+ lead 181, also connected directly to the flexible leaf 175, and a grounded lead 182. A small resistor 183 is included in this circuit to limit the peak amplitude of the charging current through the condenser 180. Thus the condenser 180 is normally held in its charged condition. When the push button 160 is depressed it closes its normally open contacts 184 thus permitting the condenser 180 to discharge through a resistor 185. The junction between the contacts 184 and resistor 185 are connected to the reset lead 161 and the momentary voltage developed across the resistor 185 provides the reset voltage for resetting the product counter. Simultaneously the voltage developed across the resistor 185 by closure of the contacts 184 provides a voltage pulse which is transmitted through a diode rectifier 190, condenser 191, and resistor 192 to the grid circuit of a thyratron 193. The thyratron 193 includes the solenoid 169 in its plate circuit so that when it fires it energizes the solenoid. The plate circuit for the thyratron 193 may be traced from the B+ lead 181, through the flexible leaf 175, contacts 176 and 177, lead 194 connected to the solenoid 169 and thence through the coil of the solenoid to an anode 195 of the thyratron 193. Cathode 196 of the thyratron 193 is connected directly to the grounded lead 182. A grid 197 of the thyratron 193 is normally biased to cut off voltage or beyond cut off voltage by bias voltage supplied through a resistor 198 and grid current limiting resistor 199.

When the voltage impulse obtained from the starting button contacts 184 is applied to the grid circuit of the thyratron the thyratron fires or conducts current and this current flow through the solenoid 169 draws the armature 170 downward, as shown in the figure, thereby bringing the contacts 173 and 174 together and by the force exerted on these contacts separating the contacts 176 and 177. The closure of the contacts 173 and 174 connects a condenser 200 through current limiting resistor 201, arm 171, and contact 173 to the B+ lead thus charging the condenser 200 to the B+ potential. The opening of the contacts 176 and 177 opens the anode circuit to the thyratron 193 thus allowing it to deionize so that its grid 197 may regain control and hold the thyratron in nonconducting condition. The deionization of the thyratron is aided by a diode rectifier 202 that is arranged to short circuit the coil of the solenoid 169 and thus absorb the inductive voltage that is generated in the solenoid coil when the current flow is interrupted. With the current flow through the solenoid 169 interrupted, the armature 170 is released allowing the spring 168 to advance the ratchet wheel 165 one step and thus at the completion of such step bring the contact 172 back into contact with its mating contact 203. This completes a circuit from the condenser 200 through the now closed contacts 172 and 203 to an output lead 204 that feeds the ninth level 151 of the stepping relay 118 and thus provides the signal to the pulse generator for tripping it into a cycle of operation according to the setting of the then connected multiplier selector switch. The last pulse from the generator on lead 163 is fed to the thyratron grid circuit to fire the thyratron and thus advance the stepping relay.

This circuit thus provides the time delays and timing sequence required in the multiplying circuit shown in Figure II since the last pulse generated by the multiplier pulse generator is fed through the lead 163 to trip the thyratron 193 thus causing a stepping operation by cocking the stepping or return spring 168 and at the same time charging the condenser 200 so as to provide the voltage pulse at the completion of the operation.

False resetting of the counter in response to the pulses delivered over the input lead 163 and possible feedback through resistor 192 and condenser 191 is prevented by the diode rectifier 190 and the relatively low resistance of the discharge resistor 185.

False operation due to the possible bouncing or intermittent contact of the contacts either in the start switch or starting key 160 or the contacts 172, 203 is prevented by connecting these contacts in the circuit in such a way that when they are driven to one limit of their travel the condenser is charged to the voltage required for the signal pulse and then when the contacts return to their other limit of travel the condenser is discharged through a circuit having a very short time constant. The discharge of the condenser provides the output signal during the initial contact and the repeated closure on the bouncing of the contacts is without effect because the condenser 180 or condenser 200, as the case may be, is then completely discharged.

The multiplier pulse generators 3, 7, 11, 15 or 101 are preferably constructed of a plurality of single cycle oscillators arranged to execute their cycles of operation successively each being triggered or started from the preceding oscillator. These oscillators may take several forms, the preferred form being a chain of blocking oscillators, a variety of oscillator in which the oscillator tube is normally biased to current cut off, and the grid circuit is inductively coupled to the plate circuit so that in response to a voltage impulse one cycle of oscillation will be completed and the tube will then return to its quiescent or nonoscillating condition and wait for the next starting impulse. The circuit arrangement used in these multiplier generators is illustrated in Figure IV. As shown in this figure the input pulse either from the starting or input lead 1 or from the preceding pulse generator or from the leads 153, 154, 155, or 156 is fed through an input lead 210 as shown in Figure IV and by means of a switching contact arm 211, representative of a multiplier selector switch, is directed to one of a number of input terminals marked from zero to nine inclusive. These terminals constitute separate inputs to various stages in the blocking oscillator chain. Each blocking oscillator consists of a single triode 212 having a plate 213, grid 214, and a cathode 215. The plate 213 and grid 214 are inductively coupled through a transformer 216 having a grid winding 217 and a plate winding 218. The plate winding 218 is connected between a B+ lead 219 and the plate 213 of the tube and is in parallel with a damping resistor 220. The grid winding 217 of the transformer is connected between the grid 214 and a bias resistor 221 that is connected to a bias lead 222 maintained sufficiently negative with respect to ground so that the tube will not normally draw any current.

All of the oscillators are similar in that they have the elements just described and all have their cathodes connected in parallel, except for the tenth stage, and have these cathodes returned to ground through a cathode resistor 223. The output pulses are taken from the common cathode connection through an output line 224 that is representative of the output leads 4, 8, 12, and 16 of Figure I or the output lead 107 of Figure II. The tenth oscillator of the chain has its own cathode resistor 225 so as to deliver a single triggering pulse from its cathode through an output lead 226 which serves to supply the input signal for the next multiplier generator in the circuit shown in Figure I or the impulse for the stepping relay as transmitted through the lead 163 of Figure II. In addition each stage or oscillator has a coupling condenser 227 connected between its plate 213 and the resistor end of the grid winding of the next transformer for the next stage.

In the operation of such a circuit a positive voltage pulse applied through one of the input terminals from the switch 211 causes a momentary positive voltage to be transmitted through the grid winding as a conductor to the grid 214 of the tube thereby causing the tube to draw plate current. The initial plate current of relatively small magnitude generates through the transformer a positive voltage on the lead connecting the grid winding to the grid so as to drive the grid of the tube further in a positive direction thereby increasing the plate current. This action is cumulative as long as the plate current can increase and generate grid voltage. As soon as the circuit saturates with full current flowing through the tube and the cathode resistor 223 there is no longer any increase in current flow and hence no voltage generated in the secondary winding or grid winding of the transformer. The grid thereupon loses its positive voltage and cuts off the flow of current through the tube thus terminating the cycle of oscillation. The resulting positive pulse of voltage appearing at the plate of the tube as the current flow is cut off is transmitted through the coupling condenser 227 and serves as a triggering impulse to start the next oscillator.

In this arrangement the number of pulses delivered to the output lead 224 depends upon which stage of the series of blocking oscillators is selected for the introduction of the starting pulse. If the pulse is introduced into the left-hand stage, the one marked 9, all of the blocking oscillators execute one cycle of oscillation in sequence thereby delivering nine pulses on the output lead. However, if the input pulse is applied say at the number 2 terminal only the last three of the blocking oscillators operate thereby delivering two impulses in the output lead 224 and the single impulse on the output lead 226. Thus the number of impulses to be generated for each incoming impulse is controlled by merely selecting the point in the chain at which the incoming pulse is applied.

While blocking oscillators are preferred as a simple form of pulse generator other types of single cycle oscillation generators may also be employed. The only requirement is that each generator or each oscillator deliver one cycle and at the close of its cycle of operation produce an output pulse which may trigger the succeeding stage of the chain.

The multiplier pulse generators as illustrated in Figure IV are not suitable for use in a parallel operation because each generates a series of pulses corresponding to the input terminal selected for the introduction of the input pulse. For parallel operation it is necessary that an invariable number of pulses be generated for each input pulse and that switching means be employed on the output side of the pulse generator for selecting the desired pulses according to the multiplicand factor. A pulse generator suitable for use in the multiplicand portion of the circuit shown in Figure I or Figure II is illustrated in Figure V. In common with Figure IV, Figure V shows a chain or series of blocking oscillators except that all the oscillators rather than a selected number are used each time.

In this circuit twelve blocking oscillators are employed, each being like the others except for the cathode connections. Each of the oscillators comprises a triode section 230 of a dual triode tube having a plate 231, control grid 232, and cathode 233. The cathodes are connected, either singly or in combination with cathodes of other oscillators of the chain, through cathode resistors to ground. Cathode resistor 234 serves the first two oscillators of the chain. The control grid 232 and plate 231 are inductively coupled through a transformer 235 having a grid or secondary winding 236 and a primary or plate winding 237. The plate current for the tube is obtained from a B+ lead 238 the circuit being from this lead through the primary winding 237 of the transformer 235, through the tube plate 231 to cathode 233 and thence through the cathode resistor 234 to grounded lead 239. The primary or plate winding 237 of the transformer is paralleled with a damping resistor 240. Grid bias to maintain the tube at current cut off is obtained from a bias line or bias lead 241 through a grid biasing resistor 242 that is connected to one end of the secondary or grid winding 236, the other end of the winding being connected to the grid 232. Starting pulses for the pulse generator are introduced through an input lead 243 and condenser 244 that is connected to the junction between the resistor 242 and the grid winding 236 of the transformer 235. An output pulse from the plate circuit of the first oscillator stage is taken through a coupling condenser 245 to the resistor end of the secondary or grid winding of the transformer for the next oscillator stage.

As described in connection with Figure IV a positive voltage impulse applied to the coupling condenser 244 causes the tube to draw current from the B+ lead 238 through the primary winding 237 of its transformer 235 to the tube. As long as such current flow is increasing a voltage is generated in the secondary winding 236 tending to drive the grid positive and maintain the current flow. As soon as the tube saturates or draws its maximum current the current increase is stopped and hence there is no voltage generated in the secondary winding 236 and the grid immediately returns to its negative potential relative to ground thus cutting off current flow through the tube. The cut off in current causes a sharp positive rise in voltage at the plate 231 which is communicated through the coupling condenser 245 to start the next stage into its cycle of oscillation.

As each stage in the chain of oscillators undergoes its cycle of oscillation a positive voltage pulse appears across its cathode resistor. Thus the first pulses from the first and second oscillators appear across the cathode resistor 234 and are fed out through an output lead 246 leading to a diode matrix circuit 247. The next four oscillators in the chain have their cathodes tied together and to the grounded lead 239 through a common cathode resistor 248 thus providing four impulses that are transmitted over an output lead 249 to the diode matrix circuit 247. The seventh and eighth oscillators of the chain have their cathodes tied together and to ground through a resistor 250 and are connected through lead 251 to the diode matrix circuit 247.

The ninth oscillator of the chain has its own cathode resistor 252 and the voltage at the cathode of this stage is transmitted through a lead 253 to the diode matrix circuit and also through an output lead 254 which leads to the first carry storage circuit. The last three oscillators of the chain have individual cathode resistors 255, 256, and 257 and the cathodes of these stages are connected to output leads 258, 259, and 260 which correspond respectively to the output leads 147 to 150 inclusive of Figure II. The chain of oscillators thus delivers a total of nine pulses on the leads 246, 249, 251, and 253 which may be combined by suitable switching circuits to provide selectable numbers of pulses per input pulse received on the lead 243 as well as a series of individual pulses following the others in time and suitable for clearing the carry circuits employed between the stages of the electronic counter into which the pulses are being transmitted for registration.

The diode matrix 247 is representative of the diode matrix circuits 30, 54, 69, and 77 shown in Figure I and the diode matrix circuit 113 shown in Figure II. In each case the circuit comprises a number of diode rectifier or semi-conductors that are arranged to connect the various leads from the multiplicand pulse generators to nine output leads which feed the nine terminals of the selector switches used for selecting the multiplicand factors. As shown in Figure V the output lead 253, which carries one impulse per generator input pulse is connected directly to a first selector switch lead 265 which is connected directly to the number 1 terminal of each of the selector switches associated with the multiplicand generator. This same output lead 253 is connected through diode rectifiers 266, 267, 268 and 269 to output lead 270, representing the number three terminals; lead 271 representing the number five terminals; lead 277 representing the number seven terminals; and lead 278 representing the number nine terminals.

The multiplicand output lead 251 from the seventh and eighth oscillators of the chain, which carries two pulses per input pulse, is connected directly to selector switch lead 274 so as to supply this lead with two pulses per input pulse and is connected through rectifier 275 to supply two pulses to the number three lead 270 which in combination with the one pulse from the lead 253 makes three pulses for this lead. The lead 251 is also connected through rectifier 276 to supply two pulses per input pulse to the number six switch lead 277.

Output lead 249 of the multiplicand generator which carries four pulses per input pulse is connected directly to selector switch lead 278 representing the number four position and is connected through rectifier 279 to supply four pulses to the number five selector switch lead 271. This lead 249, carrying four pulses, also feeds through rectifier 280 into the number six switch lead 277 thus providing in combination with the two pulses through the rectifier 276 the six pulses required on this lead.

The lead 277 is connected through rectifier 281 to feed six pulses per input pulse into number 7 output lead 272 which in combination with the single pulse transmitted through the rectifier 278 makes up seven pulses per input pulse for this lead. The six voltage pulses appearing on the lead 277 are also transmitted through rectifier 282 into number eight selector switch lead 283. The other two pulses to make up the eight pulses for this lead are obtained from the first two blocking oscillators through lead 246 and rectifier 284. The rectifier 284 is provided to prevent any loading on the lead 283 because of the relatively low resistance of the cathode resistor 234. Finally the number nine output lead 273 receives eight pulses from the number eight lead 283 through rectifier 285 which in combination with the single pulse obtained through rectifier 269 make up the nine pulses per input pulse for the selector switch lead 273.

The output impedance of the various groups of oscillator stages as represented by the resistance of the cathode resistors 234, 248, 250, and 252 is low enough compared to the input impedance of the carry circuit amplifiers to which the impulses are transmitted so that any reasonable number of selector switches may be connected in parallel to the matrix output leads and thus provide the pulses for the various stages of the product counter.

The essential difference between this pulse generator and the one illustrated in Figure IV is the fact that the preceding one, Figure IV, generates only a selected number of pulses which varies according to the selector switch position whereas the generator shown in Figure V generates an invariable number of pulses and the selection is made on the output side where several switches may be connected in parallel to feed selected numbers of pulses into various decades of the electronic counter used to count the pulses representing the product of the multiplication.

In the circuits shown in Figures I and II the output pulses from the multiplicand selector switches were transmitted through amplifiers and carry storage circuits into the respective decades of the product electronic counter. Where there is no preceding or lower order decade an amplifier only is required between the selector switch and the counter decade. Wherever there is simultaneous or possibility of simultaneous entry of data from carry pulses from the preceding decades and pulses from selector switches the carry storage circuits must be employed.

A typical carry storage circuit is illustrated in Figure VI. As shown in this figure positive pulses received from the selector switches are taken through an input lead 290 from a selector switch 291 which is representative of any of the multiplicand selector switches shown in Figures I and II. The positive pulse of voltage on the lead 290 is transmitted through a coupling condenser 292 and diode rectifier 293 to a control grid 294 of a pentode amplifier having its plate 295 connected to a B+ lead 296 by way of a plate resistor 297. The amplifier has its cathode 298 and suppressor grid 299 connected directly to a grounded lead 300. The amplifier grid 294 is biased to plate current cut off by a grid leak resistor 301 that is connected to a bias voltage lead 302 that is maintained approximately 8 volts negative with respect to ground by voltage divider resistors 303 and 304 connected between the grounded lead 300 and a source of negative potential of approximately 16 volts employed in the pulse generator circuits. The amplifier serves as a phase reversing device to convert the positive voltage pulses received from the multipliers through the selector switches into negative pulses suitable for operating an electronic counter of the type illustrated in U.S. Patent No. 2,521,788. The negative voltage pulse from the plate 295 of the amplifier is clipped at a predetermined level determined by resistors 305 and 306 connected between the B+ lead and ground. The clipping is accomplished by a rectifier 307 connected between the output lead from the plate 295 and the midpoint between the resistors 305 and 306. The resistor 306 is by-passed with a condenser 308 to reduce the apparent impedance at this junction. There is an amplifier such as the one just described for each of the decades in each of the electronic counters illustrated in Figures I and II.

A carry pulse storage circuit is associated with each of the amplifiers used between the electronic counters for storing the carry pulses until the completion of the cycle of operation of the multiplicand generator in response to each pulse received from the multiplier generator. These storage circuits are similar to the one illustrated in Figure VI and comprise a dual triode 310 connected in a bistable multivibrator circuit similar to a conventional binary counter circuit. In this particular circuit arrangement cathodes 311 and 312 of the double triode are tied together and connected to ground through cathode resistor 313 and cathode by-pass condenser 314. Plates 315 and 316 are connected to the B+ lead 296 through plate resistors 317 and 318 respectively.

Control grids 319 and 320 cooperating with the cathodes 311 and 312 respectively are connected to ground through grid return resistors 321 and 322 and are each tied to the opposite plate through plate to grid resistors 323 and 324 the latter two resistors being by-passed by condensers 325 and 326 respectively. The grid resistor 322 is returned to the reset circuit rather than directly to ground. The reset lead is connected to ground through a low resistance usually in the order of 200 to 500 ohms and may be considered as grounded except for the reset voltage applied momentarily during resetting of the circuits.

Circuit values for the plate, grid, and grid to plate resistors in order to secure bi-stable operation are similar to those used in the electronic counter stages and ordinarily are of the order of 50,000 ohms for each of the plate resistors 317 and 318, 300,000 ohms for each of the plate to grid resistors 323 and 324, and 100,000 ohms for each of the grid to ground resistors 321 and 322. The cathode resistor for this set of values should be in the order of 12,000 ohms. The plate to grid condensers should be in the order of 50 micro-microfarads and cathode condenser may be .01 microfarad or larger. With these values the circuit is bi-stable in that if the grid 320 is driven positive, as by a reset pulse, current will flow through the plate resistor 318, through the tube and cathode resistor 313 in an amount sufficient to drop the potential of the plate 316 and drive the grid 319 of the other triode section negative to current cut off. The resulting potential increase at the plate 315 coupled through the coupling resistor 324 holds the grid 320 at cathode potential so as to maintain the current flow. Any pulse that cuts off the current flow momentarily causes current to flow, after the pulse through the plate 315 and cathode 311 to reverse the condition of current flow.

Negative voltage pulses representing the carry from an associated decade of the product counter are carried or transmitted over a lead 330 and series connected condensers 331 and 332 to momentarily drive the grid 320 negative. Momentarily driving this grid negative cuts off current flow through the plate resistor 318 thus applying a positive voltage to the coupling resistor 323 and condenser 325 to drive the grid 319 of the other triode section positive and thus establish current flow through the left-hand section of the triode. This is the storage condition of the tube with the carry pulse or carry information stored therein. The input circuit is stabilized so as to always respond to the negative counter carry pulses by a parallel combination of a resistor 333 and rectifier 334 that are connected between the junction of the condensers 331 and 332 and ground. The rectifier is polarized so as to shunt any positive voltages appearing at the junction of the condensers to ground while permitting negative voltage pulses to be transmitted directly to the grid of the tube.

At the end of each series of pulses generated in the multiplicand pulse generator a separate carry storage clearing pulse is generated for each carry circuit. Such a pulse is delivered over lead 325 and series connected condensers 336 and 337 to the grid 319 of the dual triode 310. In order to minimize the number of components in the multiplicand pulse generator the ninth oscillator is used to feed a pulse into the diode matrix shown in Figure V as well as to the first of the carry storage circuits. Therefore it is necessary that the carry storage circuit respond to the trailing edge of the pulse rather than the leading edge so as to avoid interference between the last counting pulse and the clearing pulse. This is accomplished by by-passing the positive portion of the pulse to ground through rectifiers 338 which is in parallel with resistor 339 and connected to the junction between the condensers 336 and 337. Thus as the voltage on the lead 335 goes positive current flow through the condenser 336 and rectifier 338 to ground charges the condenser 336 without transmitting an appreciable voltage pulse to the grid of the tube. On the return to zero, the trailing edge, of the clearing pulse from the pulse generator the junction between the condensers 336 and 337 is driven negative thus transmitting a negative signal through the condenser 337 to grid 319 to cause current cut off in the left-hand section of the tube. This current cut off results in a positive voltage pulse at the plate 315 which is transmitted through a coupling condenser 340 to grid 294 of the amplifier tube thus driving the grid positive to provide the negative signal on its plate 295 which is delivered as a counting signal into the next decade of the counter.

The clearing pulses received over the lead 335 do not produce a pulse at the plate 315 unless a carry pulse has previously been received in order to trigger the tube into the condition with the left-hand side conducting current. If the left side is nonconducting the negative pulse merely increases the negative grid bias without producing any current changes in the tube and thus no output signal. Thus the carry storage circuit transmits a pulse to the next counter only in the event that it has received a carry pulse from the preceding counter subsequent to the last resetting pulse or the last clearing pulse.

The electronic counters illustrated in Figures I and II as registers for the product of the computation are conventional decades each consisting of four binary flip-flop stages connected according to the disclosure of U.S. Patent No. 2,521,788. Each decade consists of four flip-flop or binary stages one of which is illustrated in Figure VII. Each stage comprises a dual triode tube 341 that has its grids and plates cross connected to provide bi-stable operation. The circuits for the tube comprise a common plate resistor 342, individual plate resistors 343 and 344, individual grid to plate resistors 345 and 346, grid to ground resistors 347 and 348 as well as cathode resistor 349 and cathode condenser 350. The plate to grid resistors 345 and 346 are by-passed with small condensers 351 and 352.

The plate resistor 343, the plate to grid resistor 345, and the grid to ground resistor 347 are connected in series between the resistor 342 and ground. Similarly the plate resistor 344, plate to grid resistor 346, and grid resistor 348 are also connected in series and connected between the common plate resistor 342 and ground by way of the reset circuit as indicated by lead 353 (Figure VII). The circuit values for this circuit are the same as those indicated for the corresponding elements in the circuit associated with the dual triode 310 shown in Figure VI. The tube operates with one side or the other conducting current and the other side cut off. The condition of current conduction can be varied or changed from one side to the other by negative voltage pulses applied through an input condenser 354 connected to the common plate resistor 342 so as to simultaneously drive the plates of the tube negative momentarily to cut off current flow. The charges on the plate to grid condensers when the pulse disappears causes the previously nonconducting side of the tube to conduct current. Thus the cycle of operation is completed by two pulses and the tube acts as a scale of two counters. Output pulses to drive the next stage of the counter are taken from the junction between the plate and plate to grid resistors 344 and 346 through a condenser 355 which may serve the next stage in the same capacity as the condenser 354 serves the first. The potentials at the plates of the triodes are taken through output leads including series resistors 356 and 357 to indicating mechanism that may be neon lamps or other voltage sensitive indicating devices to indicate the state of conduction of the dual triode 341.

As indicated in the patent above referred to certain feedback connections comprising series condensers and resistors are connected between the certain plates of the third and fourth stages of a binary decade to control grids of the second and third stages respectively so as to arbitrarily feedback certain pulses resulting from operation of the third and fourth counter stages to reset the second and third stages and thus cause a complete cycle of operation to be accomplished with ten input pulses rather than the sixteen that normally would be required for complete cycling of a four stage binary counter.

The indicating mechanism for the electronic counter is not illustrated because various conventional types of well known indicating equipment may be connected to the counter depending upon the type of output indication desired. These may include neon glow tubes connected to the counter, or various types of stepping switches or similar devices that assume different positions according to the count stored in a counter.

The multiplier pulse generators illustrated in Figures I and II and in detail in Figure IV employ electronic tubes as the amplifying elements for each of the oscillators. A similar pulse generator may be constructed using resistances, condensers and transistors. Such a circuit is illustrated in Figures VIII and VIIIa. Such a circuit comprises a chain of individual oscillator stages all of the stages being similar and arranged so that the output pulse from each stage may serve as the input pulse for the next. Each stage comprises a transistor having a base 360, a collector electrode 361, and an emitter electrode 362. The base 360 is connected through a 3,000 ohm resistor 363 to a grounded lead 364. The collector electrode 361 is connected through a load resistor 365 of 3,000 ohms to a negative supply lead maintained at approximately minus 25 volts. The emitter electrode 362 is connected directly to ground through a small condenser 366 of approximately 500 micromicrofarads. The emitter is also connected to an output lead 367 through a small coupling condenser 368, the output lead 367 being grounded through a resistor 369 which with the condenser 368 provides a time constant short in comparison with the time of one cycle of each of the transistor stages. The emitter is supplied with voltage at approximately minus 15 volts through a resistor 369 of approximately 5,500 ohms. Input pulses from a lead 370 are transmitted through selector switch 371 to a selected one of the bases 360 of the various transistors according to which of the stages is to be initially energized. Likewise, a trigger voltage of each stage, which is developed across the load resistor 365, is applied through a coupling condenser 372 to the base of the next transistor stage.

Normally the emitter is biased sufficiently negative so as to inhibit current flow through the transistor from its base to its collector electrode. Upon the application of a negative pulse of voltage to the base 360 the bias between the base and the emitter is reduced to a point where the emitter draws appreciable current. This current supplied by the condenser 366 results in a much larger current flow from the base to the collector thus resulting in a continuing negative voltage applied to the base 360 thus holding the bias at a low value. As the emitter draws current from the condenser its voltage drops or goes negative thus resulting in decreasing the current flow through the transistor resulting in a positive going voltage appearing at the base and a negative going voltage appearing on the collector electrode. With the combination of values shown the action is regenerative or of a trigger nature in that little current flows in the collector circuit until the emitter bias is reduced by the negative voltage supplied to the base. When this occurs the current flow through the base to the collector suddenly increases and the current flow from base to emitter suddenly rises to a large value by the amplifying action resulting from the changes in voltage at the electrodes. Then as the emitter current decreases as the condenser 366 is charged by current flow from the emitter, the current flow decreases until suddenly it reaches a critical point when it is cut off suddenly to zero value.

The negative voltage impulses at the emitter electrode are transmitted through the coupling condenser 368 to the output lead 367 and since the time constant of the condenser 368 and the common grounding resistor 369 is small compared to the time constant resulting from the flow of current to the condenser 366 this circuit has the effect of differentiating the emitter voltage signal thus producing a peaked wave form suitable for use with the counter. This wave form is transmitted to the counter after amplification and serves to drive the counter a number of steps depending upon how many of the transistor stages was included and operated by each impulse from the scale. As before, the selector switch such as the switch 371 is included to transmit the impulse from the preceding generator to the selected one of the transistor stages. Likewise the output from the number 1 transistor stage, the last one in the chain, is fed back through the last or zero switch point to the first or number 9 stage of the following pulse generator.

Figure VIIIa illustrates the relationship between the emitter voltage and emitter current. As shown in this figure with a load line such as a line 374 drawn to correspond to the resistance of the emitter resistor 369 the static or stable operating condition occurs at a point P with the emitter drawing a slight negative current and the collector current cutoff. The input voltage pulse applied to the base has the effect of momentarily reducing the bias so that transistor operating point moves from point P along the characteristic curve to a critical point Q. After passing the point Q the current suddenly rises because of the amplifying action of the transistor and the current through the emitter and collector increases until limited by the circuit elements at a point R on the characteristic curve. At this time the emitter is drawing a relatively heavy current, the current flowing from the base to the emitter to charge the condenser 366 in the negative direction so that the operating point then follows from R along the curve to a second critical point at the valley marked S. Upon reaching this point the emitter condenser 366 is charged to a higher negative voltage and this is sufficient at the reduced collector current to cause the transistor to suddenly cut off and the operating point then follows trigger-wise from the point S to a point on the characteristic curve below the point P. The circuit then returns to a stable state, with the transistor drawing a slight negative current, at the point P. Thus for each voltage pulse applied to the base of the transistor the transistor executes one cycle and transmits an output pulse to the counter and another pulse to the following transistor stage of the chain so that the following stage can then generate its pulse and so on to transmit the pulse throughout the chain of transistors.

The multiplier pulse generator chain for generating a series containing a selectable number of pulses for each impulse received from the weighing scale may also be constructed of multivibrators, a form of resistance capacity coupled oscillator. Such a circuit arrangement is illustrated in Figure IX. As shown in this figure the oscillator chain comprises a series of stages, each having a dual triode tube 380-388. Tubes 381 to 387 corresponding to stages 8 to 2 inclusive are not shown on the drawing. Each of the multivibrator stages including its twin triode tube consists of a pair of cathodes 390 and 391 connected in parallel through a cathode resistor 392 to a grounded return lead 393 that is common to all of the stages. Each of the triodes also includes a plate or anode 394 cooperating with the cathode 390 and a second anode 395 cooperating with the cathode 391. Control grids 396 and 397 cooperate with cathodes 390 and 391 respectively. The anode 394 is connected through a resistor 398 of approximately 100,000 ohms to a B+ supply lead 399. Likewise the anode 395 of the second half of the triode is connected through a 50,000 ohm resistor 400 to the supply lead 399. The control grid 396 cooperating with the cathode 390 is connected through a 500,000 ohm resistor 401 to the grounded lead 393 while the second control grid 397 is connected through a one megohm resistor 402 to the positive supply voltage lead 399. The anode 394 is further connected by a 1,500 micro-microfarad condenser 403 to the control grid 397. Furthermore, the cathodes are connected through a 100 micro-microfarad condenser 404 to a common output lead 405 which is grounded through a 100,000 ohm resistor 406. The output lead 405 is connected to the corresponding multiplicand generator in a circuit as shown in Figures I or II.

Each of the multivibrator circuits is coupled to the next in the chain by a 33 micro-microfarad condenser 407 which serves to connect the second grid 397 of one stage to a first grid (corresponding to the grid 396) of the following stage.

Input pulses from the start key or a preceding multiplier are supplied through a lead 411 and a coupling condenser 412 to the moving arm 413 of a multi-point selector switch and from the taps of the switch through a lead 414 to the number 9 stage grid 396 or through lead 415 to the number 8 stage or through corresponding leads to the other stages of the oscillator chain. Thus a number of stages of the oscillator chain are included depending upon the selection made through the switch 413.

The number 1 stage comprising the dual triode 388 has an output connection 420 connected through a lead 421 to the zero point of the selector switch 413 and through an output lead 414 to the input switch of the next mul-

21 tiplier. As in the preceding circuits should the value for this particular multiplier be selected as zero the start impulse or the pulse in the preceding multiplier is transmitted directly through the switch to the output connection 414.

In this particular circuit the output lead 405 to the multiplicand generator has a pulse of voltage appearing thereon as each of the multivibrators goes through its cycle of operation. In the quiescent or stable state each of the multivibrators is drawing current through its right hand section as illustrated in the drawing which for the number 9 stage comprises the resistor 400, plate 395 and cathode 391. This flow of current, since the control grid 397 is drawing current through the one megohm resistor, is determined almost entirely by the magnitude of the resistors 392 and 400. The application of a positive pulse of voltage to the control grid 396 causes current flow through the left half of the triode which by the amplifying action produces a negative going signal at the plate 394 which coupled through the condenser 403 drives the second or right half control grid 397 negative so as to cut off the flow of current through the second half or right-hand section of the tube. This results in the left-hand section of the tube drawing current at a rate determined by the 100,000 ohm plate resistor 398. The current flow through the tube under this condition is about half of what it was under the prior state. When the condenser 403 is charged through the resistor 402 so that the second half of the tube again draws current the tube quickly returns to its initial state thereby increasing the current flow through the cathode resistor 392. This positive increase in voltage resulting from the increased current appears on the output lead 405 as a short duration pulse determined in time by the time constant of the coupling condenser 404 and the common resistor 406. Likewise the positive going signal appearing at the grid 397, as the first half of the triode cuts off, is transmitted through the condenser 407 to initiate a cycle in the following stage.

While this circuit is economical to build, the output pulses on the lead 405 are not as great as those produced by the inductively coupled oscillator circuits illustrated in Figures IV or V. This is because of the overlapping or simultaneous transfer of current flow through the cathode resistor 392 whereby a portion of the output voltage from one cathode is lost because of the simultaneous reverse voltage from the other cathode. The difference in plate resistor is the principal reason for the usable output voltage on the cathode connection.

These several circuits illustrating various types of electronically controlled pulse generators all serve the same function of generating a series of pulses of selected number suitable for operating following mutipliers or decades of an electronic counter. In each case the multiplication takes place serially so that there is no danger of simultaneous entery of values into any of the counters and therefore no change of error from such simultaneous entry.

The improved multiplier may also be constructed using a delay line together with suitable amplifiers. Such an arrangement is shown in Figure X. This circuit comprises a tapped delay line 425 having a delay per section of from one to two microseconds, or more according to requirements. Shaped pulses from an amplifier or other means transmitting start pulses from a key or a previous generator having a time duration less than the time delay of one section are applied to a selector switch 426 having ten points corresponding to the possible values of a digit of the multiplier. The pulses from the switch points are transmitted through diode rectifiers 427 to taps 428 of the delay line. The number one to number nine switch points are interconnected by rectifiers 429 arranged to pass current from the high valued points to the low valued points. The ends of the delay line are terminated in resistors 430 and 431 to prevent reflections of the voltage pulses from the ends of the line.

The input pulses applied to any selected switch point are transmitted simultaneously to the associated tap of the delay line and to all taps to the right as shown in the figure. Thus wave trains of $n$ pulses are produced (where $n$ is the number of the tap at which the switch is set) that travel toward the ends of the line 425. As each pulse of the train reaches the right end of the line it drives a grid 432 of an amplifier in the positive direction thus producing a negative pulse at a plate 433 of the amplifier. The negative pulses are transmitted directly to a corresponding decade of an electronic counter or to a following generator.

In the multiplier arrangement shown in Figure II a stepping relay was employed to switch the various circuits so as to repetitively employ the multiplier and multiplicand pulse generators. The mechanical speed limitations of a stepping relay limit its operating speed to approximately 60 steps per second which, since the multiplication sequence requires from four to five steps, results in a total computing time for four digit factors of approximately $\frac{1}{12}$ to $\frac{1}{15}$ of a second. The operating speed may be materially increased without sacrifice of accuracy or reliability and with little increase in complexity of circuits by employing an electronic switching circuit instead of the mechanical stepping relay.

Figures XI and XII show circuits utilizing purely electronic means for switching the circuits involved in operating the multiplier and multiplicand pulse generators sequentially and repetitively. In the circuit shown in Figure XI four flip-flops, i.e. bi-stable multivibrator circuits, one for each factor in the multiplier are arranged to take the place of the stepping relay as far as sequencing the signals are concerned. In this arrangement the flip-flops or multivibrators are all normally in their "off" condition and are arranged to control gates in the switching circuits so that the entire system is at rest with all of the gates non-conducting. When an initiating or starting impulse is received the first of the flip-flops is turned to its "on" condition thereby delivering a voltage impulse through the units selector switch of the multiplier. At the same time this flip-flop energizes the gates to connect the multiplicand selector switches shown in Figure II to the corresponding amplifiers and carry storage circuits to register the units partial product in the product counter.

When the pulse has traversed the multiplier pulse generator and appears on its output lead it resets to "off" all of the flip-flops shown in Figure XI and as these are reset the first one transmits a signal to a second to turn it to its "on" condition thus leaving the second one "on" and the other three "off." This second flip-flop in turn transmits a signal to the tens selector switch of the multiplier at the same time energizing the gates or switching circuits to route the output pulses of the multiplicand generator now representing the tens partial product to the respective amplifiers and decades to add the tens partial product to the amount then in the counter. Upon the completion of the second cycle when the output pulse again appears on the output lead of the multiplier pulse generator the flip-flops are again reset and in the process the third is turned to its "on" condition thereby transmitting a signal to the hundreds switch of the multiplier and setting the gate circuits to route the multiplicand output pulses to the proper counter stages or decades. The same happens again for the fourth flip-flop representing the thousands digit of the multiplier.

If greater capacity is required in the circuit additional flip-flops are added one for each additional place required.

As shown in Figure XI flip-flops A, B, C, and D each consists of a dual triode tube 440 having a left-hand plate 441, left-hand grid 442, left-hand cathode 443, and corresponding right-hand plate 444, grid 445, and cathode 446. The plate 441 is fed from a B+ lead 447 through a plate resistor 448 and is connected to the right-hand grid 445 through a plate to grid resistor 449 which is in parallel with a condenser 450. The grid 445 is tied to ground through a grid return resistor 451. Likewise, the right-hand plate 444 is connected to reset lead 452 through a plate resistor 453 and is connected to the left-hand grid 442 through the parallel combination of a resistor 454 and condenser 455. The grid 442 is connected to the grounded lead through a grid resistor 456. The cathodes 443 and 446 are tied to the grounded lead through a cathode resistor 457 and by-pass condenser 458.

The reset lead 452 is connected to the B+ lead 447 through a low impedance in an amplifier circuit responsive to the tenth or last output pulse of the multiplier generator so as to deliver a sharp negative pulse of voltage to the lead 452 as the last pulse is being generated in the generator. The impedance of this circuit is low enough so that between resetting impulses the lead 452 is maintained at approximately the same potential as the B+ lead 447.

After the multiplier and multiplicand factors have been set into the proper selector switches as illustrated in the circuit of Figure II a start pulse is delivered over input lead 460 to the grid 442 of the left-hand section of the triode 440. The input signal is sharp positive voltage pulse and when delivered to the grid 442 causes the left-hand section of the tube to conduct current thus dropping the potential at the plate 441 and driving the grid 445 negative so as to cut off current flow in the right-hand section of the tube. This current cutoff causes the potential of the plate 444 to become more positive and in an amount sufficient to maintain the grid 442 above cathode potential or at cathode potential thereby maintaining current flow to the left-hand section of the tube. The positive going step of voltage resulting from this transfer is transmitted through resistor 461 to grid 462 of a cathode follower tube 463 which has its plate 464 connected to the B+ lead 447 and has its cathode 465 connected through resistor 466 to grounded lead 459. Output voltage is taken through an output lead 467 to gating circuits and through condenser 468 to the moving arm of the units selector switch for feeding the pulse into the multiplier pulse generator. The grid 462 of the cathode follower stage is also connected through the grid resistor 469 to a bias lead 470 that is maintained sufficiently negative so that when the plate 444 is drawing current, which is the normal "off" condition for the flip-flop A, the grid 462 is driven negative with respect to ground so as to cut off any current flow through the cathode follower stage.

The time constant of the condenser 468 and the input circuit to the multiplier pulse generator is short enough so that the positive going step of voltage resulting when the left-hand section of the flip-flop A became conducting is transmitted as a sharp voltage pulse to the multiplier. Likewise a steady positive voltage is maintained on the lead 467 to the gating circuit so that these are maintained in conduction condition throughout the time the flip-flop A is in its "on" condition.

When the next reset pulse from the multiplier, which in the system shown in Figure II causes the stepping relay to advance, appears on the lead 452 it drives the plate 444 as well as the grid 442 negative so as to cut off the current flow through the left-hand section of the flip-flop A and at the same time it drives the grid 462 of the cathode follower in the negative direction to cut off the voltage supply to the A gate circuits. This deenergizes the gates and at the same time by cutting off the current flow in the left-hand section causes the potential of the plate 441 to rise and as it rises in potential the right-hand section of the tube tends to become conductive thus holding the plate 444 at its negative potential. The current cut off in the left-hand section of the triode 440 and the subsequent or consequent rise in voltage of the plate 441 is transmitted as a positive going signal through coupling condenser 471 to a left-hand grid 472 of the second flip-flop B. This positive going voltage coupled through the condenser 471 is of sufficient amplitude to override, at the grid 472, any negative going voltage transmitted from the reset lead 452 through the left-hand plate resistor of the second flip-flop stage B. Actually there is very little signal appearing at the grid 472 because of the reset voltage on the lead 452 for the reason that flip-flop B is in its "off" condition with the right-hand side of the tube drawing current through the left-hand plate resistor corresponding to the resistor 453 of the first flip-flop stage A. The reset voltage merely decreases the current flow through this resistor without appreciably changing the potential at the plate of the tube. Thus the voltage pulse from the preceding flip-flop transmitted through the condenser 471 is effective in causing current flow through the left-hand section of the next flip-flop thereby driving the right-hand grid negative so that the right-hand plate does not draw current and a positive voltage therefore appears on its output lead 473 to drive the associated cathode follower stage 474 to transmit a starting pulse into the second multiplier selector switch and supply potential to the gate circuits associated with the second flip-flop.

It will be noted that in this circuit the gates are turned off with the initiation of the reset pulse and are turned on simultaneously with the transmission of the starting pulse into the multiplier.

It is to be understood that this circuit shown in Figure XI takes the place of the stepping relay shown in Figure II and that the same multiplier and multiplicand pulse generators are employed as are shown in Figure II.

A suitable gating or switching circuit to be operated electronically is illustrated in Figure XII. The output voltages appearing at the cathodes of the cathode follower stages associated with each of the flip-flops A, B, C, and D of Figure XI and corresponding respectively to the units, tens, hundreds, and thousands places in the multiplier are used to control the plate voltage of the triode gating tubes illustrated in Figure XII. Eight dual triodes are employed thus making 16 individual triode sections, four being required in each of the units, tens, hundreds, and thousands places.

As shown in Figure XII the gating voltage on the lead 467 is applied directly to plates 476, 477, 478, and 479 of the right-hand row of switching tubes. Cathodes 480, 481, 482, and 483 of these triodes are connected directly to the amplifiers of the carry storage circuits 484, 485, 486, and 487 of the product counter respectively. Voltage pulses from the multiplicand pulse generator shown in Figure II and taken from its output selector switches are transmitted through lead 488 for the thousands place, lead 489 for the hundreds place, lead 490 for the tens place, and lead 491 for the units place. Thus when cathode follower 463 of flip-flop A corresponding to the units figure of the multiplier is energized the plates 476 to 479 inclusive are held at a positive voltage so that positive voltage applied to grids 492, 493, 494, and 495 result in plate current flow and the transmission of voltage pulses to the counter amplifiers. The number of pulses transmitted to each amplifier corresponds to the number of pulses received from the multiplicand pulse generator.

While not shown in Figure XII it is to be understood that each of the carry storage circuits 484 to 487 and the carry storage circuits associated with a higher value decades are cleared at the end of each series of pulses in the multiplicand generator by pulses appearing on its clearing output leads as shown in Figure II. Since the clearing pulses are not commutated or switched it is also assumed that additional clearing pulses are generated and supplied to the additional carry storage circuits shown in Figure XII thus all of the storage circuits will be cleared after each individual series of pulses from the multiplicand pulse generator. This change is for convenience only in that it is more economical to supply the additional pulses in each cycle of the multiplicand pulse generator than it is to provide the additional gating circuits required to switch the clearing pulses from one storage circuit to another as needed.

As soon as the multiplier pulse generator has delivered its nine pulses to a multiplicand generator and its tenth pulse is transmitted over a reset lead 452 flip-flop A is turned off and as it is turned off with the reset pulse or simultaneous with the reset pulse the lead 467 is driven negative or to ground potential so that any pulses then appearing on leads 488 to 491 inclusive are not transmitted at sufficient amplitude to operate the counter.

When the second flip-flop B is turned on, as part of the resetting of flip-flop A, it energizes the plates of the second from the right row of gating tubes so that the pulses appearing on the leads 488 to 491 are transmitted to the carry amplifier and storage circuits and hence through the counter decades but advanced one step or one decade from the condition when lead A was energized. Thus proper column shift is accomplished. The same holds true when flip-flops C and D of Figure XI are operated to energize the plate circuits of the third and fourth rows of gating tubes.

By employing electronic switching circuits in place of the stepping relay shown in Figure II approximately a tenfold increase in operating speed is accomplished. The operating speed for the circuit of Figure II as modified according to Figures XI and XII is determined primarily by the rate by which the counters can accept input pulses, assumed to be 100,000 cycles per second, and the time required for each cycle of operation of the multiplicand pulse generator. Since the multiplicand pulse generator must generate nine pulses plus the storage clearing pulses it must generate at least fifteen pulses per cycle of operation in this particular arrangement. It will be recalled that the ninth pulse of the multiplicand generator and the first of the storage circuit clearing pulses are taken from the same blocking oscillator in the pulse generator. The counting pulse is taken from the leading edge of the pulse and the clearing pulse is taken from the trailing edge. On the basis of fifteen output pulses per cycle of operation of the multiplicand generator it can accept input or starting pulses at the maximum rate of 6,660 cycles per second. Allowing a margin of safety, reduces the rate to about 6,000 cycles per second. The multiplier pulse generator must generate four trains of pulses each having a maximum of ten pulses with the pulses occurring at a repetition frequency of 6,000 cycles per second. Assuming forty pulses, four trains of ten each, at this rate gives a total time for one complete multiplication operation of six milliseconds. This is the time required when the multiplier factor is all nines. The time required for a multiplication is proportional to the sum of the digits in the multiplier and is proportionally reduced as this sum is reduced.

Figure XIII illustrates another circuit or arrangement of pulse generators and counters for performing a multiplying operation. In the preceding arrangements pulses were fed from the multiplicand generator into several stages of the product counter simultaneously. This required that carry storage circuits be employed between the various stages of the counter. In the system shown in Figure XIII such storage circuits are eliminated by feeding the pulses into the counter decades sequentially and are never fed into two decades at the same time so that the carry pulse from one decade would interfere with pulses fed directly to the next higher decade. The arrangement shown in Figure XIII includes two multipliers 500 and 501 which are of the same type as those shown for the multiplier generators in the preceding circuits. The multiplier 500 is arranged to operate at an output signal repetition rate in the order of 2,000 cycles per second while the multiplier generator 501 is designed to operate at an output repetition frequency of 100,000 cycles per second. In this arrangement a plurality of flip-flop circuits are employed to operate sequencing and gating circuits similar to those shown in Figures XI and XII. Flip-flops 502, 503, and 504 are associated with the multiplier 500. In the operation of the circuit after selector switch 505 corresponding to the hundreds digit of the multiplier; switch 506 corresponding to the tens digit, and switch 507 corresponding to the units digit have been set a start pulse is applied through lead 508 to turn the first flip-flop 502 to its on condition whereby it provides an output pulse to the switch 505 and a steady gating voltage on its output lead 509 that supplies operating potential to gates 510, 511, and 512. As the pulse generator 500 goes through its cycle of operation it delivers its output pulses, equal in number to the setting of the switch 505, over its output lead 513 and supplies a tenth or final pulse at the end of the train over a reset lead 514 that serves to reset the flip-flop stages 502, 503 and 504 to their "off" condition. The resetting of the flip-flop 502 to its "off" condition turns the second flip-flop 503 "on" whereupon it delivers a starting pulse over its output lead to the switch 506 and supplies gating potential over its output lead 515 to operate gates 516, 517, and 518. At the termination of the second train of pulses in the pulse generator 500 the flip-flops are again turned off and the third flip-flop 504 is turned on to provide a starting pulse for the units switch 507 and a gating voltage over output lead 519 for gates 520, 521, and 522.

The output pulses from the first pulse generator 500 delivered over its output lead 513 are fed as starting pulses into a flip-flop stage 525 having an output lead that feeds selector switch 526 corresponding to the hundreds figure of the multiplicand. Output pulses from the multiplier 501 are fed through its output lead 527 into gates 528, 529, and 530. The gate 528 receives its energizing potential from the flip-flop 525 while the gate 529 receives its energizing potential from flip-flop 531 corresponding to the tens digit of the multiplicand while the gate 530 receives its operating potential from flip-flop stage 532 associated with the units digit of the multiplicand. The last or terminal impulse from the pulse generator 501 is fed through its reset lead 533 to reset the flip-flops 525, 531, and 532 to their "off" condition. Resetting flip-flop 525 to its "off" condition turns flip-flop 531 "on" whereupon it supplies a pulse to selector switch 534 of the multiplicand generator and the turning "on" of the third flip-flop 532 at the completion of the tens cycle provides a starting pulse over selector switch 535 for the units digit of the multiplicand.

The gating circuits are arranged such that the gate 528 feeds its output signals to the gates 510, 516 and 520 while the gate 529 feeds its output signals to the gates 511, 517, and 521 while the third gate 530 feeds its output signals to the gates 512, 518, and 522.

It will be observed that the gates are arranged in series so as to provide paths from the output lead 527 of the high speed multiplier 501 to the various counter stages 540 to 546 of a product counter according to which ones of the flip-flops are operating. With the switches in the positions as shown wherein the multiplicand is set at the figure 357 and the multiplier is set at the figure 463 the operation may be traced from the start impulse applied over lead 508 in the following manner.

The starting pulse turns the flip-flop 502 to its "on" condition whereupon it delivers its output pulse through switch 505 and the number four input lead to the multiplier 500. The multiplier thereupon generates four impulses that appear on the lead 513 and each serves as a starting impulse for the flip-flop 525. The starting impulse to the flip-flop 525 turns it "on" whereupon it delivers an impulse through selector switch 526 to the number three input to the multiplier 501 whereupon it generates three impulses which are fed out through the lead 527 and through the gate 528 which is on simultaneously with the "on" condition of flip-flop 525 thence through gate 510 which is "on" simultaneously with the "on" condition of flip-flop 502 and thence through output lead of the gate 510 to the ten thousands decade 544 of the product counter. Since the pulses represent tens of thousands they are fed into the ten thousands decade and the carry pulses when this counter fills are fed to the hundred thousands decade 545 and, if several products are to be totaled, the overflow is fed into the millions decade 546.

The fourth pulse from the generator 501 is delivered over its output lead 533 to turn the flip-flop 525 "off" and turn the flip-flop 531 "on." Thereupon a signal is fed to the number five multiplier terminal through switch 534 at the same time that gate 529 is turned on so that the five pulses to be generated in the multiplier 501 are fed through the gate 529 and gate 511 into the thousands decade 543 of the product counter. The sixth pulse in this train of pulses is delivered through lead 533 to turn the flip-flop 531 "off" and turn flip-flop 532 "on" whereupon the pulse is delivered through selector switch 535 to the number seven multiplicand input terminal whereupon seven pulses are transmitted through the output lead 527. At this time since flop-flop 532 is on and controls gate 530 the pulses are routed through gates 530 and 512 to the hundreds decade 542 of the product counter. The eighth pulse in this train of pulses, seven being delivered over lead 527, is delivered over lead 533 to turn the flip-flop 532 "off." This being the last in the train the system remains idle until it receives the next input pulse over lead 513.

Thus for each of the four pulses delivered over lead 513 the multiplier 501 through the gating circuits delivers three pulses to the ten thousands decade, five to the thousands decade, and seven to the hundreds decade. This makes a total of twelve pulses delivered to the ten thousands decade which would result in a final registration of two in the decade 544 and a carry of one in the decade 545. Next there would be a total of twenty pulses delivered through the gates 529 and 511 to the thousands decade leaving it registering zero with two carry pulses having been delivered to the ten thousands decade 544. Since these pulses occur subsequent in time to the direct entry into the decade 544 there is no interference or loss of count. Finally, twenty-eight pulses are delivered in total through the gates 530 and 512 into the hundreds decade thus leaving it with a registration of eight with two carry pulses having been transmitted to the thousands decade 543.

As the pulse generator 500 completes its cycle of operation and transmits its reset pulse through its output lead 514 the flip-flop 503 is turned "on" and the flip-flops 502 and 504 are turned off thus setting the circuits to operate the gates 516, 517, and 518. The pulses now generated in the pulse generator 501 are routed to the thousands, hundreds, and tens decades respectively of the product counter. Likewise, at the completion of this series of pulses through the generator 500 the flip-flop 504 is turned on and the others off so that its output pulse applied to the selector switch 507 of the units multiplier digit to start the final series of pulses. The resulting pulses from generator 501 are routed through the gates 528, 529, and 530 and gates 520, 521, and 522 to the hundreds, tens, and units decades 542, 541, and 540, respectively of the product counter.

In this arrangement the partial products are computed by serially counting pulses and are fed into the product counter as computed without storage of carry pulses. This series method of operation results in a computing time which is several times longer than the computing time of the circuit arrangement shown in Figure I or the arrangement shown in Figure II as modified by the addition of the electronic switching according to the circuits shown in Figures XI and XII. The increase in computing time in this circuit of Figure XIII results from the fact that pulses are transmitted to the product counter serially, that is one at a time, and there is never any simultaneous entry. This means that the product is formed by counting three composite pulse trains, one for each of the hundreds, tens and units figures of the multiplier and each consisting of individual pulse trains of from zero to nine pulses each as generated in the pulse generator 500 corresponding to the multiplicand. Thus a maximum for three digits in each multiplier and multiplicand is thirty pulse trains of thirty pulses each with additional time required for operating the flip-flops to transfer the gating circuits and supply the starting pulses for each increment or each train of pulses.

This system is still fast enough for many types of calculations and the simplicity acquired by elimination of the storage circuits makes it feasible for these applications.

Various modifications of the circuits shown in the several multiplying arrangements may be made without departing from the scope of the invention.

This application is a continuation-in-part of application Serial No. 519,468.

Having described the invention, we claim:

1. In an electronic computer, in combination, first pulse generator that generates a series of pulses equal in number to a digit of a multiplier, a second pulse generator that is triggered by each of the pulses from the first pulse generator, at least one output circuit from the second pulse generator, switching means settable according to the value of a digit of the multiplicand connected to the second pulse generator to regulate the number of pulses appearing on the output circuit for each first generator pulse, and an electronic counter for counting the pulses appearing on said output circuit.

2. In an electronic computer, in combination, first pulse generating means that generates a continuous series of pulses equal in number to the value of a multiplier, a multiplicand pulse generator that is repetitively triggered by the pulses from the first pulse generating means and that generates another series of pulses for each triggering pulse, at least one output circuit from the multiplicand pulse generator, switching means settable according to the value of the multiplicand connected to the multiplicand generator to regulate the number of pulses appearing on the output circuit for each first generating means pulse, and an electronic counter for counting the pulses appearing on said output circuit.

3. In an electronic computer, in combination, first pulse generating means that sequentially generates a plurality of series of pulses each series being equal in number to a digit in a multiplier, at least one multiplicand pulse generator that is triggered by each pulse transmitted to it from the first generating means and that generates a series of pulses in response to each triggering pulse, first switching means connected to the multiplicand pulse generator for selecting the number of pulses delivered by the generator for each pulse received, a multi-decade electronic counter adapted to count output pulses from the multiplicand pulse generator, and means for switching the output of the multiplicand pulse generator from decade to decade of the electronic counter as successive series of pulses are applied to the multiplicand pulse generator.

4. In an electronic computer, in combination, first pulse generating means that generates for each digit of a multiplier a series of pulses equal in number to the value of the digit and a trigger pulse, said generating means having a plurality of input selector switches for determining the number of pulses to be generated in each series, switching means that is operated in response to the trigger pulse for applying a pulse to a selected one of said input selector switches, a multiplicand pulse generator adapted to be triggered by each pulse of the series generated in the first generating means, means for determining the number of pulses delivered by the multiplicand pulse generator for each pulse received, and an electronic counter comprising a plurality of decades, said switching means being adapted to feed output pulses of the multiplicand generator to selected decades of the counter in accordance with the first generator input selector switch that receives the pulse transmitted through the switching means.

5. In an electronic computer, in combination, a first pulse generating means that generates a series of pulses equal in number to a digit of a multiplier, a multiplicand pulse generator comprising a series of single cycle oscillators arranged to generate a series of pulses in response to each pulse from the first pulse generating means, at least one output lead, switching means for determining the number of pulses delivered to the output lead for each pulse applied to the multiplicand pulse generator, and an electronic counter for counting the pulses.

6. In an electronic computer, in combination, first generating means that generates a series of pulses representing a multiplier, at least one multiplicand pulse generator that is triggered by multiplier pulses and that is adapted to generate a train containing a fixed number of pulses for each multiplier pulse, a plurality of output leads, switching circuits connected between the multiplicand pulse generator and the output leads for transmitting selectable members of pulses to each output lead for each train of pulses, a multi-decade electronic counter, said output leads being connected to certain of the decades of the counter, and carry storage means for delaying the transmission of carry pulses from one decade to the next until the end of each train of pulses generated in the multiplicand pulse generator.

7. In an electronic computer, in combination, a first pulse generator that generates a series of output pulses and a trigger pulse, sequence switching means that is advanced by the trigger pulse and that applies a starting pulse to the first pulse generator, a second pulse generator connected to the first and that generates a series of pulses for each pulse from the first pulse generator, switching means for selecting pulses from the output of the second pulse generator, an electronic counter that counts the selected pulses, and switching means controlled by the sequence switching means for connecting the selecting means to the electronic counter whereby pulses are counted according to the place value of each series generated in the first and second pulse generating means.

8. An electronic computer according to claim 7 in which a series of flip-flop electronic circuits responsive to the trigger pulses constitutes the sequence switching means.

References Cited in the file of this patent

UNITED STATES PATENTS

| | | |
|---|---|---|
| 2,394,924 | Luhn | Feb. 12, 1946 |
| 2,429,228 | Herbst | Oct. 21, 1947 |
| 2,442,428 | Mumma | June 1, 1948 |
| 2,476,066 | Rochester | July 12, 1949 |
| 2,486,491 | Meacham | Nov. 1, 1949 |
| 2,502,360 | Williams | Mar. 28, 1950 |
| 2,577,141 | Mauchly et al. | Dec. 4, 1951 |
| 2,580,741 | Dickerson | Jan. 1, 1952 |
| 2,586,409 | White | Feb. 19, 1952 |
| 2,587,979 | Dickerson | Mar. 4, 1952 |
| 2,610,243 | Burkhart et al. | Sept. 9, 1952 |
| 2,672,283 | Havens | Mar. 16, 1954 |
| 2,679,356 | Briers | May 25, 1954 |